United States Patent [19]
Yamauchi et al.

[11] Patent Number: 5,671,260
[45] Date of Patent: Sep. 23, 1997

[54] DIGITAL PROCESSING APPARATUS USING TWO SYNCHRONIZATION SIGNALS

[75] Inventors: Eiji Yamauchi, Katano; Kiyokazu Hashimoto, Matsubara; Hidemi Oka, Hirakata; Takao Kashiro, Kadoma; Iwao Hidaka, Higashiosaka; Yoshiki Yamamoto, Neyagawa, all of Japan

[73] Assignee: Matsushita Electric Industrial Co., Ltd., Osaka-fu, Japan

[21] Appl. No.: 534,512

[22] Filed: Sep. 27, 1995

[30] Foreign Application Priority Data

Sep. 28, 1994 [JP] Japan .................................. 6-232890
Dec. 16, 1994 [JP] Japan .................................. 6-313215
Mar. 27, 1995 [JP] Japan .................................. 7-067740

[51] Int. Cl.⁶ .................................. H04L 7/00; H04L 5/04; H04L 9/44
[52] U.S. Cl. .................................. 375/372; 348/500; 386/91
[58] Field of Search .................................. 348/512, 516, 348/522, 523, 529, 530, 531, 547, 540, 536, 500; 370/106; 358/319; 375/372; 386/91

[56] References Cited

U.S. PATENT DOCUMENTS

| | | | |
|---|---|---|---|
| 4,109,276 | 8/1978 | Hopkins, Jr. et al. | 348/540 |
| 4,746,996 | 5/1988 | Furuhata et al. | 386/91 |
| 4,791,498 | 12/1988 | Yoshihiro | 386/91 |
| 4,853,781 | 8/1989 | Okano et al. | 348/540 |
| 5,065,230 | 11/1991 | Kumano et al. | 358/22 |
| 5,204,787 | 4/1993 | Suzuki et al. | 386/91 |
| 5,245,430 | 9/1993 | Nishimura | 348/512 |

*Primary Examiner*—Stephen Chin
*Assistant Examiner*—Betsy Lee Deppe
*Attorney, Agent, or Firm*—Ratner & Prestia

[57] ABSTRACT

The digital processing apparatus includes a high speed response PLL that produces a first clock signal locked on the horizontal synchronization signal included in the video signal input thereto. An analog to digital converter converts the input video signal with respect to the first clock signal into a digitized video signal. A write controller controls a video memory to store the digitized video signal based on the first clock signal. A low speed response PLL produces a second clock signal based on the vertical synchronization signal included in the video signal. A read controller controls the video memory to read out the stored digitized video signal therefrom based on the second control signal. The digital processing apparatus can store and read the digitized video signal to and from the video memory stably, enabling the video signal read from the video memory to be processed effectively and securely.

13 Claims, 12 Drawing Sheets

DIGITAL PROCESSING APPARATUS USING TWO SYNCHRONIZATION SIGNALS

BACKGROUND OF THE INVENTION

1. Field of the invention

The present invention relates to a digital processing apparatus for digitizing a source signal for digital recording and, more particularly, to a digital processing apparatus for use in a digital recording apparatus such as a digital video cassette recorder and a digital video disk recorder that can digitally record a non-standard video signal.

2. Description of the Prior Art

In recent years, various kinds of digital video tape recorders such as those called D1, D2, D3, and D5 types have been developed for business use.

In addition, video cassette recorders (VCR) that incorporate a digital circuit for enabling a time axial compensation, and that utilize image compression technology for enabling digital animation recording have also been developed for commercial use. Some of these VCR's have functions for converting a non-standard signal such as a video signal including jittering or a pseudo-synchronization signal into a standard signal.

In FIG. 12, an example of a time axis compensation apparatus for removing the jittering, which is disclosed in "Time Base Corrector for Consumer VTR", ITEJ Technical Report Vol. 13, pp. 17–22, VIR '89–8, CE '89–4, August 1989, is shown. This type of signal processing apparatus is popularly referred to as "TBC." A video signal Sv input to a video signal processing (TBC) apparatus Pc through an input terminal 1 is fed to both an analog to digital (A/D) converter 5 and a synchronization signal extractor 2. The extractor 2 extracts a horizontal synchronization signal (H. sync.) and a vertical synchronization signal (V. sync.) to produce a composite synchronization signal Ss.

A control signal generator 3 generates a first reference signal Sf1 based on the H. sync. components in the composite signal Ss. This reference signal Sf1 is transferred to a phase locked loop unit (PLL) 4, a write controller 70, and a read controller 80. With respect to the reference signal Sf1, the phase locked loop unit (PLL) 4 produces a clock signal Sc in synchronization with the input video signal Sv. The write crontroller 70 produces a write control signal Sw based on the clock signal Sc and the reference signal Sf1. The read controller 80 produces a read control signal Sr based on the reference signal Sf1.

On the other hand, the A/D converter 5 converts the video signal Sv into a digital format with respect to the clock signal Sc from the PLL 4. Thus, digitized video signal Sv is transferred to a video memory 6, and is stored therein based on the control signal Sc from the PLL 4 and the write control signal Sw from the write controller 70. Thus, stored data is read out from the video memory 6 based on the read control signal Sr. The data read from the video memory 6 is sequentially transferred to a digital signal processor 9, where various digital processing such as shuffling, compression, error correction, and modulation are applied to the data. Thus, the digitally processed video signal is transferred externally through an output terminal 10.

The control signal generator 3 further generates a second reference signal Sf2 for a servo circuit (not shown) with respect to the vertical synchronization components in the composite synchronization signal Ss. This second reference signal Sf2 is transferred externally through an output terminal 11. According to a video signal recording apparatus incorporating such a conventional digital signal processing apparatus Pc, the video signal is encoded with high efficiency, and is recorded or reproduced, as follows.

The servo circuit controls the reading and writing head as a predetermined position with respect to the recording medium. Thus, the digitized video signal Sv from the terminal can be recorded on the predetermined area or position of the 10 recording medium such as a magnetic tape, a magnetic disk, or an optical disk.

Also, Japanese Laid-open Patent Publication (unexamined) No. H62-249744 published Apr. 12, 1989 proposes one example of a non-standard video signal conversion apparatus. According to this example, a clock signal having a frequency 4 fsc, supplied by an oscillator, is used for writing video data to a video memory. Note that "fsc" represents the frequency of a color burst signal. Also a clock signal synchronized with the color burst signal, having a frequency 4 fsc, is used for reading the video data from the video memory.

Furthermore, a sequential scanning conversion television receiver, for example, is proposed in Japanese Laid-open Patent Publication (unexamined) No. H62-263700 published Apr. 26, 1989. According to this example, a clock signal being phase locked on the horizontal synchronization signal is used for writing the video data to a video memory. Another clock signal having phases synchronized with the color burst of the input video signal is used for reading the data from the video memory.

Thus, the writing clock signal has the phases locked on the horizontal synchronization signal. In this example, the phase locked clock signal is obtained by a feed forward clock generation circuit that selects a clock every horizontal period, most of which are close to the horizontal synchronization signal, out of a group of delayed clocks. Due to these characteristics of making a real-time response in every horizontal period, the feed forward clock generation circuit can follow even a high frequency jitter, and is widely used for a time base corrector of the video cassette recorder.

However, such conventional digital processing apparatuses, as described above, will not function properly when a non-standard video signal is input thereto. A non-standard video signal is a signal which does not satisfy the requirements of International Radio Consultative Committee (CCIR) for a standard signal, and typically includes:

(a) a video signal having a pseudo-synchronization signal;
(b) a video signal having greater jitter;
(c) a video signal having horizontal and vertical frequencies having an irregular relation to each other;
(d) a video signal having a skew in its horizontal signal such as that reproduced by a video cassette recorder used in the home; and
(e) a video signal which is demodulated by a tuner from a signal having a weak electromagnetic field.

In the case where the reading clock Sr is locked or synchronized with the color burst signal, it is impossible to match the timing to the vertical frequency of the input video signal Sv. This is because the color burst frequency is strictly controlled in the commercial use field, but the frequencies of the horizontal and vertical synchronization signals are not controlled. In other words, there is no correlation between the color burst frequency and the frequency of the vertical synchronization signal. As a result, the number of clocks within one frame are unstable, and many complicated operations are required for controlling the timing for writing the data to the recording media and the timing for applying various processes to the video signal read from the video memory.

Furthermore, in the case that either the reading clock or the writing clock is locked, it is impossible to match the timing between the horizontal frequency and the vertical frequency of the input video signal Sv and the frequency of the reading clock signal. Therefore, the variation of data read out from the video memory relative to the input video signal is too great to stably execute the signal processing.

Still further, however, the feed forward clock generation circuit also malfunctions under a weak electromagnetic field. Therefore, the clock signal selected every horizontal period is skewed. According to this skewed clock signal, it is very difficult to execute the signal processing over plural fields such as a filtering process between the A/D converter and the video memory. This is because each signal processing operation should be completed, and the processed value at that time should be output to the register.

SUMMARY OF THE INVENTION

The object of the present invention is, therefore, to provide an optical disk apparatus which solves these problems.

The present invention has been developed with a view to substantially solving the above described disadvantages and has for its essential object to provide an improved digital processing apparatus.

In order to achieve the aforementioned objective, a digital processing apparatus for processing an analog source signal including a first synchronization signal having a first predetermined frequency and a second synchronization signal having a second predetermined frequency smaller than said first predetermined frequency, said apparatus comprises a first reference signal; generation means for generating a first reference signal based on said first synchronization signal; a second reference signal generation means for generating a second reference signal based on said second synchronization signal; a first clock signal generation means for generating a first clock signal whose phase is locked on said first reference signal; an analog to digital convertor means for sampling said analog source signal with respect to said first clock signal to generate a digitized source signal; a memory means for storing at least one field of digitized signal; a write control means for controlling said memory means to store said digitized source signal based on said first reference signal and said first clock signal; a third reference signal generation means for generating a third reference signal and a fourth reference signal based on a second clock signal, said third reference signal and said fourth reference signal each having a respective predetermined frequency that is a submultiple of said second clock signal; a second clock signal generation means for generating said second clock signal synchronized with said second reference signal and said third reference signal; and a read control means for controlling said memory means for reading said stored digitized source signal from said memory means based on said fourth reference signal and said second clock signal.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DESCRIPTION OF PREFERRED EMBODIMENTS

First Embodiment

Figure 1:
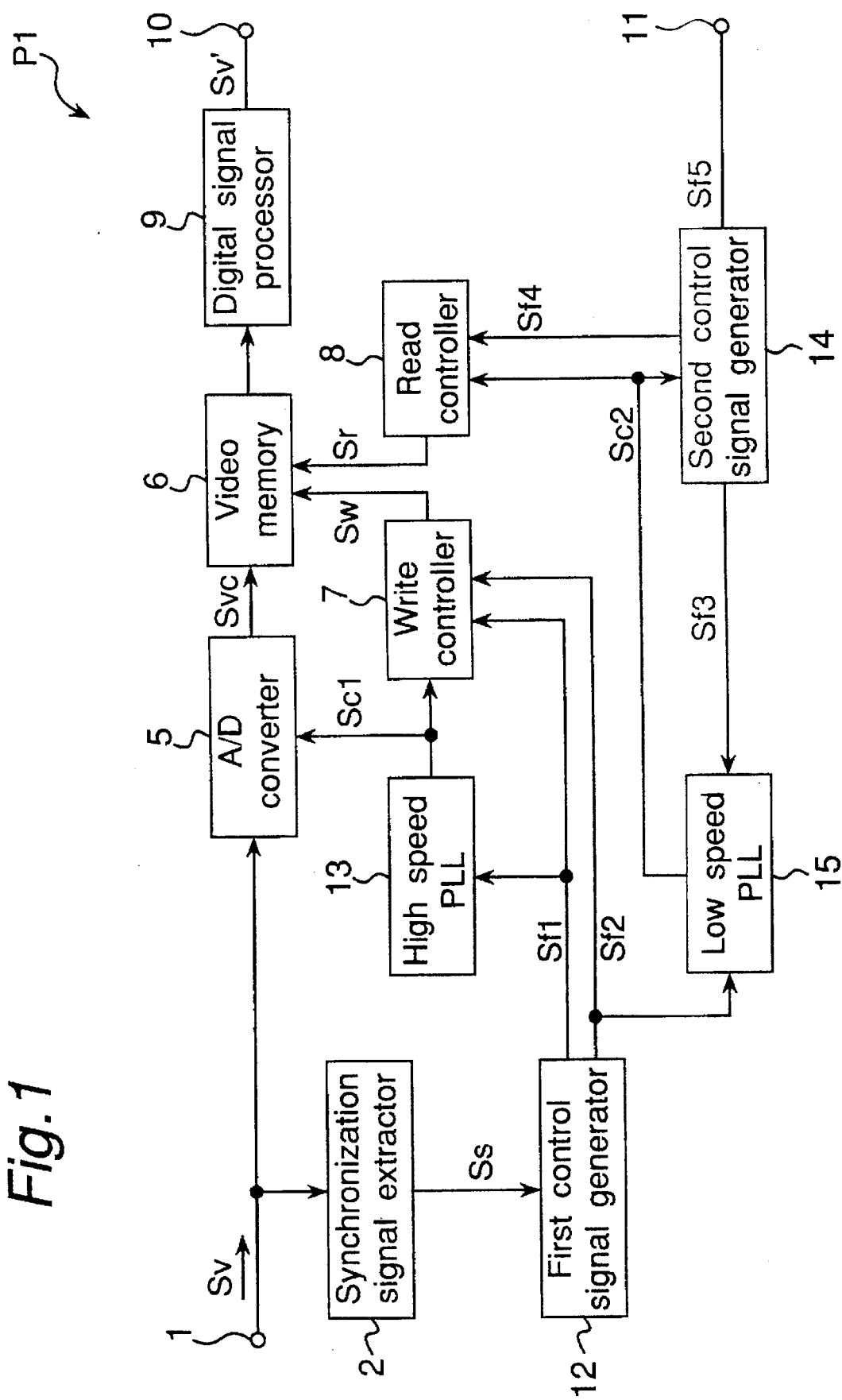
FIG. 1 is a block diagram showing a digital processing apparatus according to a first embodiment of the present invention, incorporated in a video signal processing apparatus.

Referring to FIG. 1, a digital processing apparatus according to a first embodiment of the present invention incorporated in a video signal processing apparatus for digitally recording the video signal is shown. The video signal processing apparatus P1 includes an input terminal 1 for receiving a video signal Sv from a separately provided external signal source. It is needless to say that the video signal Sv can include an audio signal therein. A synchronization signal extractor 2 is connected to the input terminal 1 for receiving the video signal Sv therefrom. The synchronization signal extractor 2 extracts a horizontal synchronization signal (H. sync.) and a vertical synchronization signal (V. sync.) from the video signal Sv to produce a composite synchronization signal Ss.

A first control signal generator 12 is connected to the extractor 2 for receiving the composite synchronization signal Ss therefrom. The first control signal generator 12 extracts the horizontal synchronization components H. sync. from the composite sync signal Ss to produce a first reference signal Sf1 as a horizontal reference signal. The control signal generator 12 further extracts the vertical synchronization components V. sync. from the composite signal Ss to produce a second reference signal Sf2 as a first vertical reference signal.

A high speed phase locked loop unit (PLL) 13 is connected to the first control signal generator 12 for receiving the first reference signal Sf1 therefrom. The PLL 13 is constructed by using a voltage control oscillator, a frequency divider, a phase comparator, and a low pass filter. The frequency divider is used to deliver an output wave whose frequency is a submultiple of a clock signal input thereto.

The phase comparator compares the phase of the reference signal with that of the output from the frequency divider. The low pass filter extracts the low frequency components in the output from the phase comparator to supply it to the voltage control oscillator.

The high speed PLL 13 responds to the high frequency of the horizontal reference signal Sf1, and produces a high speed clock signal Sc1 as a first clock signal. Thus, the high speed clock signal Sc1 has the phases synchronized with the horizontal synchronization signal in the input video signal Sv, and can rapidly follow the variation of the horizontal reference signal Sf1.

A write controller 7 is connected to the high speed PLL 13 for receiving the high speed clock signal Sc1 therefrom, and is further connected to the first control signal generator 12 for receiving reference signals Sf1 and Sf2 therefrom. The write controller 7 calculates the effective data in the video signal Sv based on the vertical and horizontal reference signals Sf1 and Sf2 with respect to the clock signal Sc1. For example, when the video signal Sv conforms to the NTSC system, the effective data corresponds to the range starting from lines 23 to 262, and from lines 285 to 524, and the range from 123 to 842 samples are counted from the trailing edge of the horizontal reference signal Sf1. Then, the write controller 7 produces the write signal Sw, indicative of the calculated effective data.

An analog to digital (A/D) converter 5 is connected to the input terminal 1 and the high speed PLL 13 for receiving the video signal Sv and the high speed clock signal Sc1 therefrom, respectively. The A/D converter 5 samples the video signal Sv with respect to the clock signal Sc1 to produce a digitized video signal Svc.

A video memory 6 for storing video data for more than one field is connected to the A/D converter 5 and the write controller 7 for receiving the digitized video signal Svc and the writing signal Sw therefrom, respectively. The video memory 6 stores the video data Svc therein, based on the writing signal Sw.

A low speed phase locked loop unit (PLL) 15 is connected to the first control signal generator 12 for receiving the vertical reference signal Sf2 to produce a low speed clock signal Sc2 as a second clock signal. The low speed PLL 15 is constructed from a voltage control oscillator for producing a clock signal, a phase comparator for comparing the phases of two signals, and a low pass filter for extracting the low frequency components in the output from the phase comparator to supply thus extracted low frequency components to the voltage control oscillator.

A second control signal generator 14 is connected to the low speed PLL 15 for receiving the low speed clock signal Sc2 therefrom. Based on this signal Sc2, the signal generator 14 produces a third reference signal Sf3 as a second vertical reference signal. The signal generator 14 further delays this third reference signal Sf3 by a predetermined period Pd with respect to the second clock signal Sc2 to produce a fourth reference signal Sf4 as a third vertical reference signal. This delaying period Pd is determined according to the capacity of the video memory 6, and is measured by the second clock signal Sc2. The frequencies of signals Sf3 and Sf4 are submultiples of the low speed clock signal Sc2.

The signal generator 14 further generates a fifth reference signal Sf5 as a servo reference signal for the servo control with respect to the vertical synchronization signal Sc2. When the digital processing apparatus P1 is incorporated in a digital tape recorder, for example, a servo circuit in the control unit controls the position of reading/writing head relative to the recording medium for recording the digitized video signal Sv to a predetermined area of the medium.

The low speed PLL 15 is further connected to the second control signal generator 14 for receiving the third reference signal Sf3 therefrom. The PLL 15 compares the phase of the second (vertical) reference signal Sf2 with that of the third (vertical) reference signal Sf3. The PLL narrows the band of these compared signals sufficiently, and constructs a phase locked loop that responds to an error variation slow enough to produce the fourth reference signal Sf4.

A read controller 8 is connected to the low speed PLL 15 and the second control signal generator 14 for receiving the low speed clock signal Sc2 and the fourth reference signal Sf4 therefrom, respectively. Based on signals Sf4 and Sc2, the read controller 8 produces a reading signal Sr.

The video memory 6 is further connected to the read controller 8 for receiving the reading signal Sr therefrom. Based on this reading signal Sr, the data is read out from the video memory 6.

A digital signal processor 9 is connected to the video memory 6 for sequentially receiving the video data that is read out therefrom. The processor 9 applies various digital processing such as shuffling, compression, error correction, and modulation to the video data. Thus, a digitally processed video signal Sv' is produced.

A first output terminal 10 is connected to the digital signal processor 9 for transferring the digitally processed video signal Sv' externally therethrough.

A second output terminal 11 is connected to the second control signal generator 14 for transferring the fifth reference signal Sf5 to a control unit such as a servo circuit externally therethrough.

In operation, the analog video signal Sv input to the digital processing apparatus 1 through the terminal 1 is supplied to the synchronization signal generator 2 and the A/D converter 5. The generator 2 produces the composite synchronization signal Ss including the horizontal and vertical synchronization components.

The first control signal generator 12 applies the composite signal Ss with various processing, such as noise removal and timing adjustment, and produces the horizontal and vertical reference signals Sf1 and Sf2. Based on the horizontal reference signal Sf1, the high speed PLL 13 produces the high speed clock signal Sc1 catching up with the variation of the horizontal synchronization signal in the input video signal Sv.

On the other hand, the A/D convertor 5 converts the video signal Sv from an analog format into the digital format with respect to the high speed clock signal Sc1 from the high speed PLL 13. The write controller 7 produces the writing signal Sw for the control of data writing operation by the video memory 6 based on the high speed clock signal Sc1 and reference signals Sf1 and Sf2. Based on the writing signal Sw, the video memory 6 stores the digitized video signal Sv as an image data.

The low speed PLL 15 and the second control signal generator 14 construct a phase locked loop system, and operate as follows. The second control signal generator 14 produces the third reference signal Sf3 by frequency dividing the low speed clock signal Sc2 output from the low speed PLL 15. The phase comparator incorporated in the low speed PLL 15 compares the phases of the signal Sf3 with that of the first vertical reference signal Sf2 output from the first control signal generator 12.

The output signal from the comparator is further passed though the low pass filter having a sufficiently narrowed band, so that the low speed PLL 15 can respond to the error variations slow enough to produce the fourth reference signal Sf4. As a result, a low speed clock signal Sc2 that is synchronized with the vertical synchronization signal and is stable with respect to the error variation can be obtained.

Based on the fourth reference signal Sf4, the read controller 8 produces the reading signal Sr with respect to the low speed clock signal Sc2. Based on the reading signal Sr, the video memory 6 operates to read out the video data Svc therefrom to the digital signal processor 9.

The digital signal processor 9 applies the video data Svc read out from the memory 6 with various digital processes, and then outputs this processed video data through the first output terminal 10. Note that the fourth reference signal Sf4 is also a reference for the memory 6 to read out the data therefrom, and has an optionally determined period such as one field, one frame, or other. Also, the phase of fourth reference signal Sf4 is different from those of the first vertical reference signal Sf2 or the second vertical reference signal Sf3 by a predetermined amount.

At the same time when the digital video signal Sv' is output through the first output terminal 10, the servo reference signal Sf5 is output through the second output terminal 11. Based on this servo reference signal Sf5, the positional relationship between the recording head and the recording medium is controlled by a servo control circuit. That servo control circuit is incorporated in a digital signal recording apparatus that encodes the image information data with high efficiency and records the encoded data to a recording medium, such as, a digital video cassette recorder and a digital video disk recorder.

According to this kind of digital signal recording apparatus, the data recording operation is performed as follows. The video data or signal Sv' is fed to the recording head from the video signal processing block based on the information indicative of the current position of the recording head relative to the medium. As a result, the predetermined portion of image data Sv' through the terminal 10 is recorded to the predetermined area of the recording medium such as a tape or disk.

Figure 2:
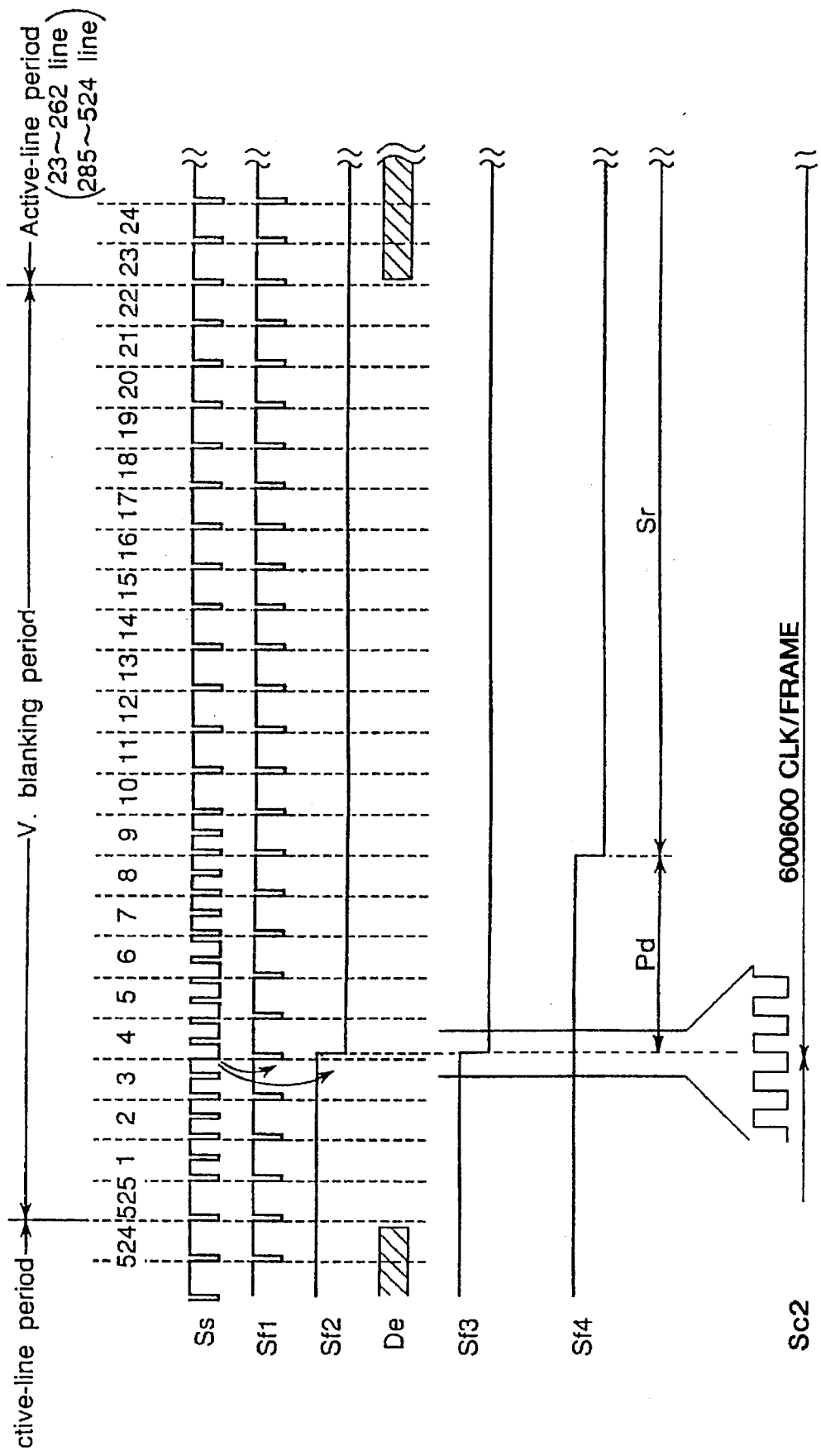
FIG. 2 is a graph showing various signals appeared in the digital processing apparatus of FIG. 1.

Referring to FIG. 2, waveforms of signals Ss, Sf1, Sf2, Sf3, and Sf4 when the digital processing apparatus of the present invention is used in an NTSC system are shown. In this example, although each of signals is shown with respect to the video signal Sv for one frame, the waveforms are substantially the same even when the video signal Sv for one field is used. A shaded area De appearing between the signals Sf2 and Sf3 indicates the effective data area ranges from lines 23 to 262 and from lines 285 to 524, wherein the area for the lines 25 to 523 is omitted for the sake of brevity.

As apparently shown in FIG. 2, the first vertical reference signal Sf2 has a trailing edge within the equalizing pulses area between the lines 1 to 9. In this example, the trailing edge falls in the line 4. According to this trailing edge of the first vertical reference signal Sf2, the second vertical reference signal Sf3 also changes from HIGH to LOW. Note that the number of pulses in the low speed clock signal Sc2, until the signal Sf3 returns to HIGH, is constant regardless of the error variations of the input video signal Sv. The third vertical reference signal Sf4 is delayed by the predetermined delaying period Pd from the second vertical reference signal Sf3, and changes to LOW in the line 9 in this example. This delay period Pd is usually 20 lines per frame under the NTSC system. According to the trailing edge of the signal Sf4, the writing signal Sw (not shown in FIG. 2) makes the memory 6 read out the data therefrom.

Figure 3:
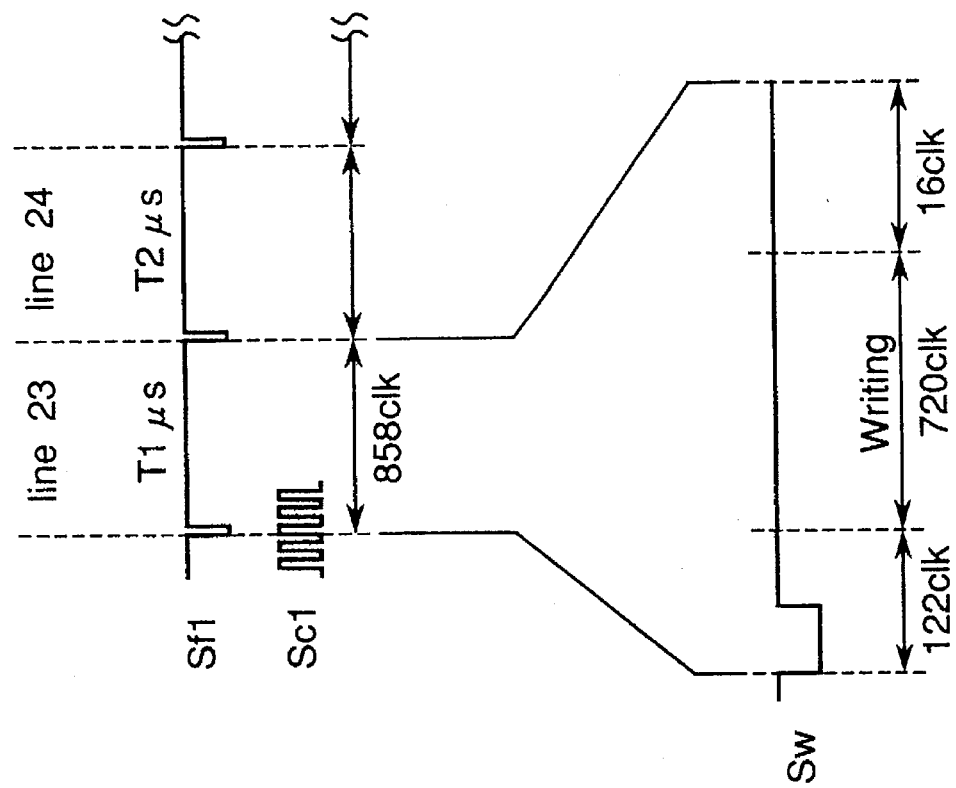
FIG. 3 is an illustration in assistance of explaining the effective data in the video data from the video memory by the digital processing apparatus of FIG. 1.

Referring to FIG. 3, the relationship between the horizontal reference signal Sf1, the high speed clock signal Sc1, and the writing signal Sw around the effective data area, lines 23 and 24 for example, is depicted on an enlarged scale. As described above, since input video signal Sv is a non-standard signal, the pulse widths T1 and T2 in the lines 23 and 24, respectively, are not the same period.

In this example, the high speed clock signal Sc1 counts 858 clocks for the period T1. Within this period T1, the writing signal Sw controls the video memory 6 to write the data from the A/D converter 5 therein as follows.

After passing the first 122 clocks, the writing signal Sw controls the memory 6 to store the data for the next 720 clocks. Thereafter, the memory 6 is released for the last 16 clocks. For example, the frequencies of high speed clock signal Sc1 and the low speed clock signal Sc2 are 13.5 MHz and 18 MHz, respectively.

As apparent from the above description, the digital processing apparatus P1 according to this embodiment includes the high speed PLL 13 and the low speed PLL 15. The high speed PLL 13 produces the high speed clock signal Sc1 synchronized with the H. Sync. signal of the input video signal Sv. The low speed PLL 15 produces the low speed clock signal Sc2 synchronized with the V. sync. signal of the input video signal Sv. By using the high speed clock signal Sc1, the analog input video signal Sv is converted into a digital signal, and is stored into the video memory 6. By using the low speed clock signal Sc2, the stored data is read out from the memory 6. As a result, various digital processing of the video signal can be performed securely and with high efficiency, even if the input video signal Sv deviates from the standard signal as specified by the International Radio Consultative Committee (CCIR).

Specifically, the clock in the digital signal processor 9 is synchronized with the V. Sync. signal of the input video signal Sv. Therefore, the number of clocks for one field or one frame of the input video signal Sv is kept constant. Usually the number of data in the input video signal Sv is constant for one horizontal scanning period, and for one vertical scanning period. As a result, there is no margin space, such as for the blanking period, necessary even when digital signal processing such as data compression, error correction coding, and modulation are applied over some fields or frames. Thus, the apparatus' circuits can be used effectively in time-division multiplexing.

Furthermore, even when such a non-standard video signal having vertical and horizontal synchronization signals whose rate is beyond the allowable range, or whose vertical synchronization frequency or phases varies greatly, the video memory 6 can absorb such non-standard varying components. Since the memory 6 cancels such non-standard components by absorption thereof, the image data therefrom is stable. Thus, the processes at the following stations can be performed securely.

Note that this memory 6 is also applicable for rearranging the sequence of video data Sv, and such a rearranging operation is usually referred to as "Shuffling". The shuffling operation can be easily realized as follows, for example. The high speed PLL 13 is set to produce the first clock signal Sc1 having the frequency of 13.5 MHz. The luminance signal and color difference signal (Cr, Cb) of video signal Sv are sampled with this frequency of 13.5 MHz and its half frequency 6.75 MHz, respectively.

Then, the low speed PLL 15 is set to produce the low speed clock signal Sc2 having the frequency of 18 MHz. The color difference signal multiplexed with respect to the time axis and the luminance signal are respectively written to the video memory 6 based on the high speed clock signal Sc1. By alternately reading the luminance signal and the color difference signal from the memory 6 based on the low speed clock signal Sc2, the data shuffling and the frequency conversion can be performed at the same time.

Usually the shuffling operation is applied to one field or one frame of data. However the capacity required for the video memory is less than one field for one field data shuffling and less than one frame for one frame data shuffling.

When general-purpose memories available in the current commercial market are used for the video memory 6, it is substantially impossible to use the entire capacity thereof. This is because such general-purpose memories, having predetermined capacities, such as 1M bits and 4M bits, are not what is necessary for the video memory 6. Therefore, a memory having greater capacity is used for the memory 6, resulting in excessive unused memory capacity.

However, according to the present invention, even such unused capacity can be used for absorbing the jitter components in the video signal Sv. Experiments indicate that that there is enough usable capacity for absorbing jitter components in the order of ten horizontal scanning periods. Note that this order of ten horizontal scanning periods is good enough for a usual time axis compensating apparatus.

Below, the jitter absorption according to the present invention is described. The digital processing apparatus P1 is a time axis compensating apparatus. The high speed PLL 13 corresponds to the jitters in the input video signal Sv, and the signal free from the jitter components is read out from the memory 6. In a video tape recorder using an analog recording system, the time axis compensation is performed at the time of signal reproduction.

However, in an apparatus which records the data in a digital format, the jitter components should be absorbed at the time of analog to digital conversion. Otherwise, the phase information of the horizontal synchronization signal is discarded. Note, this phase information is the reference for the jigger detection during the highly efficient encoding operation. Therefore, there will be no need to detect the jitters at the time of signal reproduction.

Furthermore, by making the timing for reading out the video memory 6 synchronized with the servo control circuit, the variation of timing for reading the video memory 6 and for sending the video data to the recording head can be limited only to the timing of the recording head. Due to this limitation, the margin of the buffer memory can be reduced.

When the input video signal Sv is switched to another one, there will be a discontinuity in the phase of the vertical synchronization signal thereof. When such a discontinued video signal Sv is fed into the servo control circuit, the recording head is incorrectly controlled, and is located to a non-target position. In this case, the data can not be recorded on the recording media. To prevent this incorrect control of the servo control circuit, it is necessary to reduce the response of low speed PLL 15 while not affecting the response of the servo control circuit.

Second Embodiment

Figure 4:
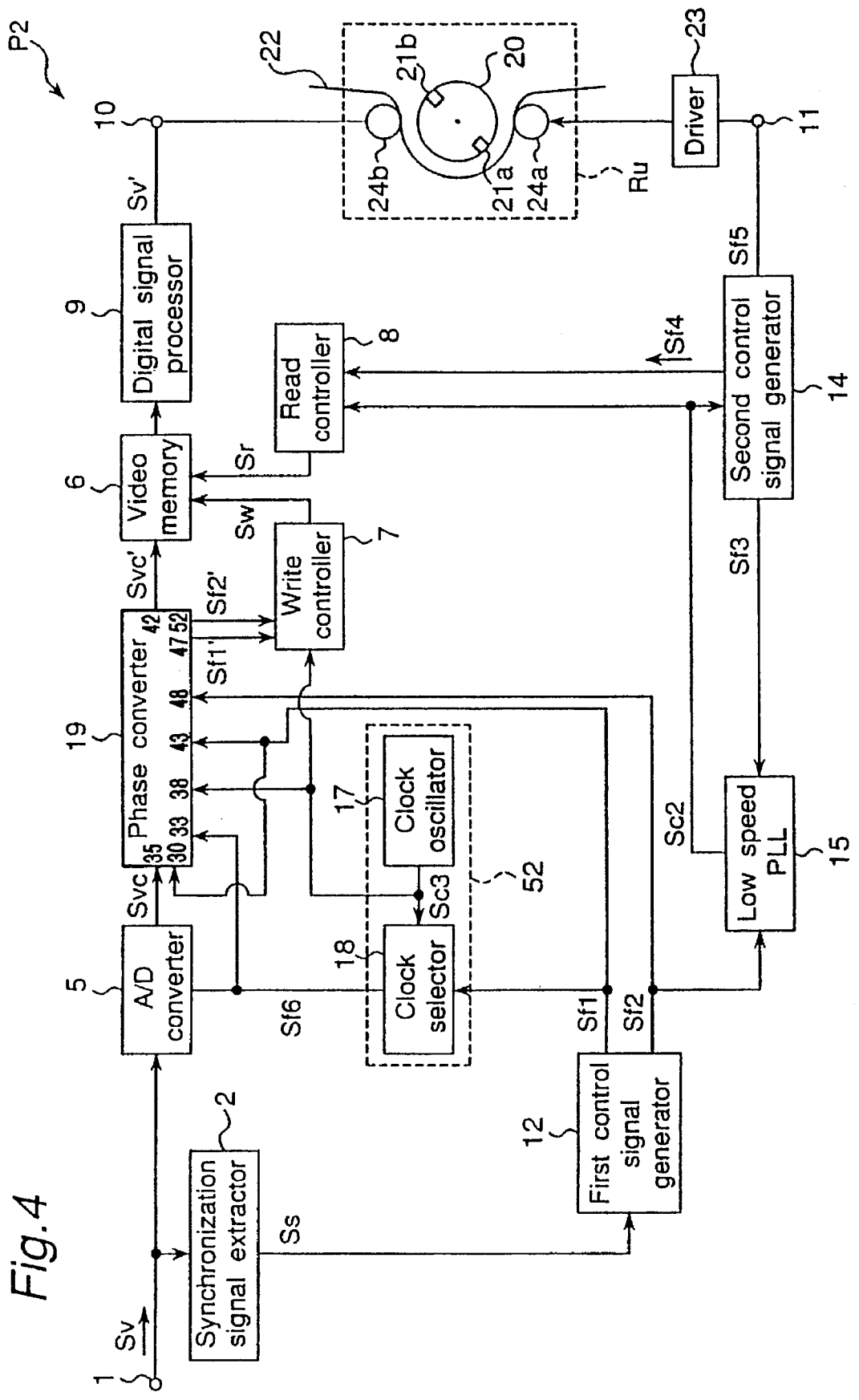
FIG. 4 is a block diagram showing a digital processing apparatus according to a second embodiment of the present invention.

Referring to FIG. 4, a digital processing apparatus according to the second embodiment of the present invention is shown. In this embodiment, the digital processing apparatus P2 has a construction similar to that shown in FIG. 1. However, the digital processing apparatus P2 additionally includes a phase converter 19 inserted between the A/D converter 5 and the video memory 6. Also, a recording unit Ru is connected between the first and second output terminals 10 and 11. Furthermore, the high speed PLL 13 is replaced by a clock signal generator 52.

The clock signal generator 52 includes a clock oscillator 17 for producing a first clock signal Sc3 having a predetermined frequency and a clock selector 18 connected to the clock oscillator 17 for receiving the signal Sc3 therefrom. The clock selector 18 is further connected to the first control signal generator 12 for receiving the first reference signal Sf1 generated therefrom.

Based on the first clock signal Sc3 and the first (horizontal) reference signal Sf1, the clock selector 18 locks the phase of the first clock signal Sc3 on that of the horizontal reference signal Sf1, and produces a phase locked signal as second clock signal Sf6. Second clock signal Sf6 is supplied to the A/D converter 5 instead of the high speed clock signal Sc1 which is produced by the high speed PLL 13 of FIG. 1.

Specifically, a delaying device incorporated in the clock selector 18 delays first clock signal Sc3 by 50 steps of 2 ns for each step. In other words, fifty clock pulses having phases, each of which precede or follow the neighboring phases by 2 ns. The clock selector 18 selects one of those fifty pulses whose trailing edge is closest to that of the horizontal reference signal Sf1, and outputs these pulses as the second clock signal Sf6. The clock selector 18 continually outputs this selected signal Sf6 for a single horizontal signal that terminates when the next trailing edge of the reference signal Sf1 is input thereto. In this sense, the reference signal Sf1 is a skewed horizontal signal.

Thus, by the clock oscillator 17 and the clock selector 18, without the voltage control oscillator used in the high speed PLL 13 of FIG. 1, a high speed response PLL can produce a second clock signal Sf6 which is phase locked on the horizontal reference signal.

The phase converter 19 is further connected to the first control signal generator 12, the clock oscillator 17, and the clock selector 18, is shown in FIG. 4, for receiving the signals Sf2, Sf1, Sc3, and Sf6 therefrom, respectively. The phase convertor 19 latches the digitized video signal Svc with respect to the signals Sf1, Sf6, and Sc3 and outputs this latched signal as a latched video signal Svc' to the video memory 6. Similarly, the phase converter 19 latches the horizontal and vertical reference signals Sf1 and Sf2 with respect to the signals Sf1, Sf6, and Sc3 and outputs these latched signals as latched horizontal and vertical reference Sf1' and Sf2' to the write controller 7, respectively.

Figure 5:
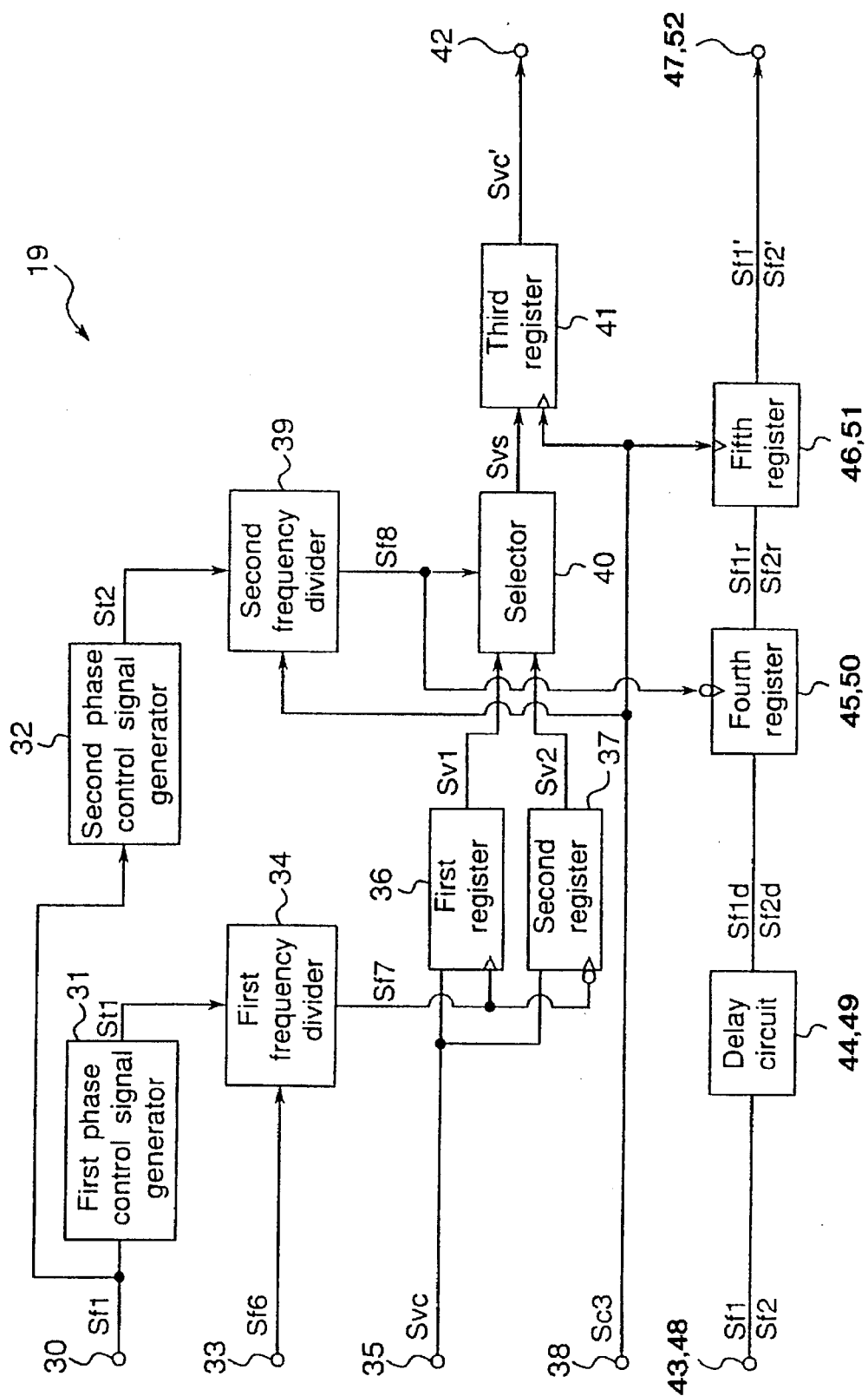
FIG. 5 is a block diagram showing a phase converter used in the digital processing apparatus of FIG. 4.

Referring to FIG. 5, details of the phase converter 19 are shown. As described above with reference to FIG. 4, the phase convertor 19 converts three signals Svc, Sf1, and Sf2 into the latched signals Svc', Sf1', and Sf2'

For the phase conversion of the video signal Sv, the phase converter 19 has four input terminals 30, 33, 35, and 38 connected to the first control signal generator 12, the signal selector 18, the A/D converter 5, and the clock oscillator 17, respectively. A first phase control signal generator 31 is connected to the terminal 30 for receiving the horizontal reference signal Sf1 therefrom. Based on the signal Sf1, the first phase control signal generator 31 generates a first set (reset) signal St1. Similarly, a second phase control signal generator 32 is connected to the terminal 30, and produces a second set (reset) signal St2.

A first frequency divider 34 for halving the frequency of the input signal into halves is connected to the terminal 33 for receiving the second clock signal Sf6 therefrom. The divider 34 is further connected to the first phase control signal generator 31 for receiving the set signal St1 therefrom. The frequency divider 34 divides the frequency of the second clock signal Sf6 with respect to the set signal St1 from the first phase control signal generator 31, and produces a seventh reference signal Sf7.

A first register 36 is connected to the input terminal 35 and the first frequency divider 34 for receiving the digitized video signal Svc and the seventh reference signal Sf7 therefrom, respectively. The first register 36 latches the digitized video signal Svc with respect to the seventh reference signal Sf7, and produces a first latched video signal Sv1.

A second register 37 is connected to the terminal 35, but is connected to first frequency divider 34 in an inverted manner. Similarly, the second register 37 latches the digitized video signal Svc with respect to the inverted seventh reference signal Sf7, and produces a second latched video signal Sv2.

A second frequency divider 39 for halving the frequency of the input signal is connected to the terminal 38 and the second phase control signal generator 32 for receiving the first clock signal Sc3 and the second set signal St2 therefrom, respectively. The frequency divider 39 divides the frequency of the first clock signal Sc3 with respect to the set signal St2 from the second phase control signal generator 32, and produces a eighth reference signal Sf8.

A selector 40 is connected to the second frequency divider 39, the first register 36, and the second register 37 for receiving the signals Sf8, Sv1, and Sv2, respectively. Based on the eighth reference signal Sf8, the selector 40 selects either one of the first and second latched signals Sv1 and Sv2 to produce a combined latched signal Svs.

A third register 41 is connected to the selector 40 and the terminal 38 for receiving the combined video signal Svs and the first clock signal on the first clock respectively. Based on the first clock signal Sc3, the third register 41 latches the video signal Svs to produce a latched video signal Svc'. This latched video signal Svc' is transferred to the video memory 6 through an output terminal 42.

For the phase conversion of the horizontal reference signal Sf1, the phase converter 19 further includes an input terminal 43, a delay circuit 44, a fourth register 45, and a fifth register 46, and an output terminal 47. The input terminal 43 is connected to the first control signal generator 12 for receiving the horizontal reference signal Sf1 therefrom. The delay circuit 44 is connected to the terminal 43 for delaying the reference signal Sf1 by a predetermined period Td to produce a delayed horizontal reference signal Sf1d. The fourth register 45 is connected to the second frequency divider 39 and the delay circuit 44 for receiving the inverted eighth reference signal Sf8 and the delayed signal Sf1d therefrom, respectively. The fourth register 45 latches the delayed signal Sf1d with respect to the inverted reference signal Sf8, and produces a latched signal Sf1r. The fifth register 46 is connected to the terminal 38 and the fourth register 45 for receiving the first clock signal Sc3 and the latched signal Sf1r therefrom, respectively. The fifth register 46 latches the signal Sf1r with respect to the first clock signal Sc3, and produces a latched horizontal reference signal Sf1'. This latched signal Sf1' is transferred to the write controller 7 through the output terminal 47.

For the phase conversion of the vertical reference signal Sf2, the phase converter 19 further includes an input terminal 48, a delay circuit 49, a sixth register 50, and a seventh register 51, and an output terminal 52 that are substantially the same as an input terminal 43, a delay circuit 44, a fourth register 45, and a fifth register 46, and an output terminal 47, respectively. For the sake of brevity, these members 48, 49, 50, 51 and 52 are shown after members 43, 44, 45, 46, and 47, respectively, in FIG. 5.

Similarly, the delay circuit 49 delays the vertical reference signal Sf2, coming from the first control signal generator 12 through the input terminal 48, by the predetermined period Td, and produces a delayed vertical reference signal Sf2d. The sixth register 50 latches the delayed signal Sf2d with respect to the reversed reference signal Sf8, and produces a latched signal Sf2r. The seventh register 51 latches the signal Sf2r with respect to the first clock signal Sc3, and produces a latched vertical reference signal Sf2'. This latched signal Sf2' is transferred to the write controller 7 through the output terminal 52.

Figure 6:
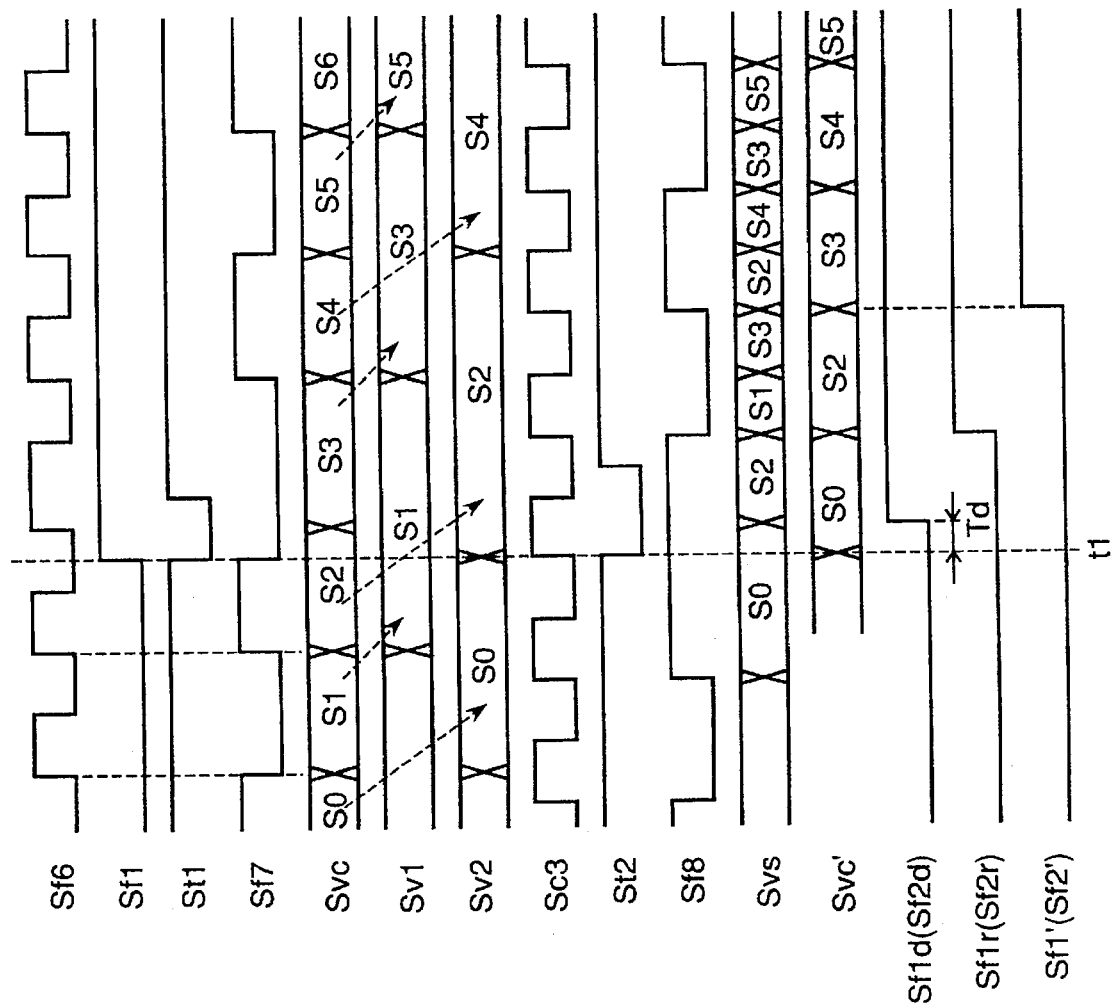
FIG. 6 is a graph showing waves appeared in the phase converter of FIG. 5.

Referring to FIG. 6, various waveforms appearing in the phase converter 19, used for the phase conversion of the video signal Svc, are shown. The first phase control signal generator 31 produces the first set signal St1 that changes to a "LOW" level at the leading edge of the horizontal reference signal Sf1 and stays there for a predetermined period.

The first frequency divider 34 produces the seventh reference signal Sf7 by halving the frequency of the second clock signal Sf6, but forcibly changes the reference signal Sf7 to "LOW" when the first set signal St1 is "LOW". As a result, the phase of the seventh signal Sf7 is always the same as that of the horizontal reference signal Sf1.

The first register 36 latches the digitized video signal Svc, at time t1, with respect to the leading edges of the seventh reference signal Sf7, and produces the first latched video signal Sv1. The second register 37 latches the digitized video signal Svc, at time t1, with respect to the trailing edges of the seventh reference signal Sf7, and produces the second latched video signal Sv2.

The second phase control signal generator 32 produces the second set signal St2 that changes to a "LOW" level at the leading edge of the horizontal reference signal Sf1 and stays there for a predetermined period.

The second frequency divider 39 produces the eighth reference signal Sf8 by halving the frequency of the first clock signal Sc3, but forcibly changes the reference signal Sf8 to "HIGH" when the second set signal St2 is "LOW".

The selector 40 produces the combined video signal Svc by outputting the first latched video signal Sv1 when the eighth reference signal Sf8 is "LOW", and the second latched video signal Sv2 when the signal Sf8 is "HIGH".

The third register 41 produces the latched video Svc' by latching the combined video signal Svs with respect to the leading edges of the first clock signal Sc3.

When the horizontal reference signal Sf1 is input to the terminal 43, the delay circuit 44 delays the horizontal reference signal Sf1 by the predetermined period Td. Note that this period Td is shorter than the "LOW" level period of the signals St1 and St2. Thus, the delay circuit 44 produces the delayed horizontal reference signal Sf1d. The fourth register 45 latches the signal Sf1d with respect to the trailing edge of the eighth reference signal Sf8, and outputs as the latched signal Sf1r. The fifth register 46 further latches this latched signal Sf1r with respect to the first clock signal Sc3, and outputs as the latched horizontal reference signal Sf1' to the terminal 47.

As a result, the signal Sf1' output from the terminal 47 has the same chronological relationship with the latched video signal Svc' outputted from the terminal 42. In other words, the block $3 of the video signal Svc' corresponds to the first data after each leading edge of the signal Sf1'. Note that the phase converting operation of the vertical reference signal Sf2 is substantially the same as that for the horizontal reference signal Sf1.

Referring back to FIG. 4, the recording unit Ru, for example a digital tape recorder, includes a cylinder 20 mounted with a pair of magnetic heads 21a and 21b. The magnetic heads 21a and 21b of the cylinder 20 is connected to the first output terminal 10 for receiving the final digital video signal Sv' therethrough and to record the signal Sv' on a recording tape 22. The recording tape 22 is guided by a pair of pins 24a and 24b to wind half around the cylinder 20. A driver 23 is connected to the second output terminal 11 for receiving the servo control signal Sf5 therethrough to drive the cylinder 20 and a recording tape 22 so that the magnetic heads 21a and 21b are located on the proper portion of the tape 22. It is needless to say that any other recording apparatus such as a digital video disk that is suitable for digital recording can be used as the recording unit Ru.

In operation, the composite synchronization signal Ss is transferred to the first control signal generator 12. The first control signal generator generates the horizontal reference signal Sf1 and the first vertical reference signal Sf2. The horizontal reference signal Sf1 is transferred to the clock signal generator 52 and the phase converter 19.

In the clock signal generator 52, the clock oscillator 17 produces the first clock signal Sc3 having a predetermined frequency free from frequency variation. The clock selector 18 shifts the phase of clock signal Sc3 in synchronization with the phase of the horizontal reference signal Sf1, and produces the second clock Sf6 following the horizontal varying components in the input video signal Sv. It is to be noted that the signal Sf6 is continual for a single horizontal scanning period, but has the skew therein every time when the horizontal reference signal Sf1 is input to the clock selector 18. This is because that the phase shift amount of the signal Sf6 varies on receipt of the signal Sf1, as described above. The A/D converter 5 digitizes the video signal Sv with respect to the second clock signal Sf6.

The phase converter 19 functions as the clock convertor for converting the output signal Svc from the A/D convertor 5, based on the signal Sf6, into the continual video signal Svc'. In other words, the second clock signal Sf6 is converted into the clock signal Scv' while the timing between the horizontal reference signal Sf1 and the digitized video signal Svc from the A/D converter 5 is kept. Then, the phase converter 19 produces the latched signals Svc', Sf1', and Sf2'.

As apparent from the above described, by providing the clock signal generator 52, and the phase converter 19, the following effect can be obtained, the digital processing apparatus P2 according to this embodiment is very effective for the following cases.

In the case that there is delay between the A/D convertor 5 and the video memory 6 when signal processing such as a digital filtering of band limitation is performed thereto, it may be impossible to transfer the video data. This is caused when the delay of the video data is greater than the blanking period, and the effective video data area overlaps with the skewed point of the second clock signal Sf6.

However, according to this embodiment of the present invention, the clock of the video signal is converted into the continuous clock signal Svc', resulting in the solution of such overlap with a skewed point. Additionally, the clock signal for the write controller 7 is also converted into the continual signal, enabling the controller 7 to operate more stably.

In the case that the input video signal Sv is comprised of a luminance signal (Y signal), color difference signals (R-Y signal, B-Y signal), and/or RGB signal, it is sometimes necessary to monitor the encoded composite signal. For encoding the color signal, a sub-carrier signal having an extremely high frequency stability is required.

However, according to this embodiment, by constructing the clock oscillator 17 with a quartz oscillating circuit, a reference signal for generating such a sub-carrier signal can be easily obtained. Furthermore, the clock signal for an encoder's circuit is a continual signal. As a result, a processing block (not shown in FIG. 4) arranged down stream of the phase converter 19 can perform all the required encoding processes. In other words, the analog video image signal can be easily obtained by utilizing the continual clock signal. It is needless to say that all the effects that the first embodiment of the present invention can be available in this embodiment.

Third Embodiment

Figure 7:
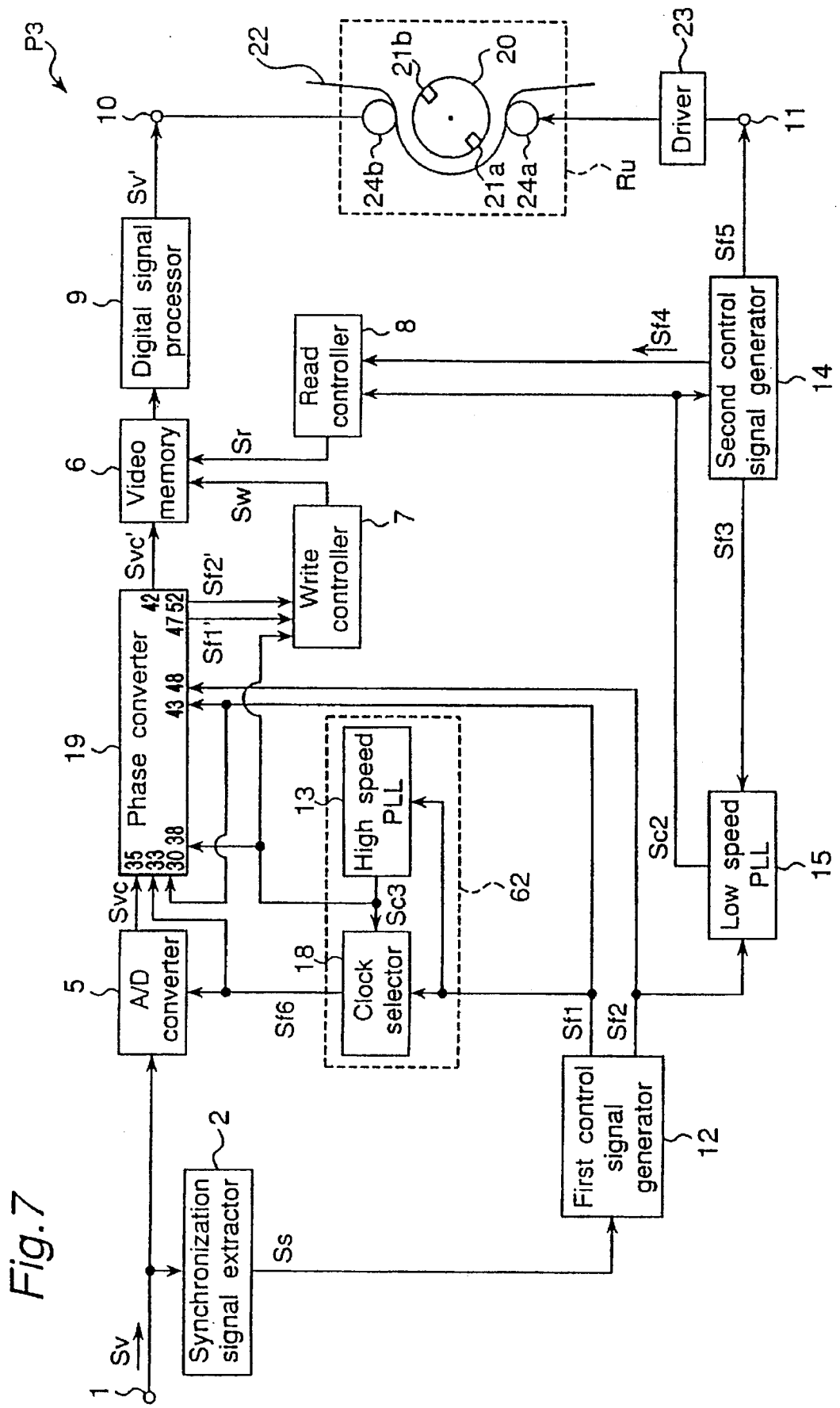
FIG. 7 is a block diagram showing a digital processing apparatus according a third embodiment of the present invention.

Referring to FIG. 7, a digital processing apparatus according to the third embodiment of the present invention is shown. In this embodiment, the digital processing apparatus P3 has a construction similar to that shown in FIG. 4. However, the clock signal generator 52 is replaced by a clock signal generator 62.

The clock signal generator 62 includes the High speed PLL 13 and the clock selector 18. The high speed PLL 13 is connected to the first control signal generator 12, and produces the signal Sc3. The clock selector 18 is connected to the first control signal generator 12 and the high speed PLL 13, and produces the signal Sf6.

The phase converter 19 is connected to the clock selector 18, the high speed PLL 13, the A/D converter 5, and the first control signal generator 12 for receiving the signals Sf6, Sc3, Svc, Sf1, and Sf2 therefrom, respectively.

According to this embodiment, a feed forward clock type generator is constructed by the high speed PLL 13 and the clock selector 18, and has the following advantage over the conventional PLL that is constructed by a voltage control oscillator. Even when non-standard components such as noises, lack of data, skews, and out of phase occur in the processing signal, the phase disturbance can be limited within a single horizontal period. As a result, the variation of timing for reading the data from the video memory can be minimized.

In operation, the first control signal generator 12 compensates the composite synchronization signal Ss for the horizontal and vertical synchronization components when these components are lacking in the signal Ss, and generates the horizontal and vertical reference signals Sf1 and Sf2. The horizontal reference signal Sf1 is transferred to the fourth clock signal generator 62 and the phase converter 19. The vertical reference signal Sf2 is transferred to the low speed PLL 15 and the phase converter 19.

The high speed PLL 13 produces the signal Sc3 whose frequency and phase are locked on those of the horizontal reference signal Sf1. The clock selector 18 shifts the phase of signal Sc3 as being synchronized with the phase of horizontal reference signal Sf1, and produces the clock signal Sf6 following the variation of the horizontal synchronization components in the input video signal Sv.

Note that the signal Sf6 is continual for a single horizontal scanning period, but has the skew therein every time the horizontal reference signal Sf1 is input to the clock selector 18. This is because the phase shift amount of the signal Sf6 varies on receipt of the signal Sf1, as described above. The A/D converter 5 digitizes the video signal Sv with respect to the signal Sf6.

The phase converter 19 functions as the clock convertor for converting the output signal from the A/D convertor 5, based on the signal Sf6, into the continual signal Svc'. In other words, the clock signal Sc3 is converted into the clock signal Sf6 while the timing among the vertical reference signal Sf2, the horizontal reference signal Sf1, and the digitized video signal Svc from the A/D converter 5 is kept. Then, the phase converter 19 produces the second vertical reference signal Sf2', the second horizontal reference signal Sf1', and the video data Svc'. The operation of the phase convertor 19 is the same as that described with reference to FIG. 4.

The second vertical reference signal Sf2' and the second horizontal reference signal Sf1' are supplied to the write controller 7. Then, the write controller 7 produces the control signal Sw for controlling the operation of video memory 6 to write the data therein. This control signal Sw is supplied to the video memory 6. The operation after reading the data from the video memory 6 is performed in the same manner as in the second embodiment.

As apparent from the above descriptions, by providing the high speed PLL 13 incorporated with the voltage control oscillator, the clock selector 18, and the phase controller 19, the following effects in addition to the effects of the apparatus P2 can be obtained in this embodiment. For example, when a video tape recorder is set to produce a greater jitter, there will be the following two problems.

One is an impact error occurring at the time when the tape contacts the recording/reproducing head. This results in high frequency jitter.

The other is a swing in the lateral direction due to the mechanism of the recorder. This results in low frequency jitter, such as 30 Hz, which the high frequency components occurring when the cylinder of the VCR is rotating at the speed of 1800 rpm according to VHS.

According to the second embodiment, the high frequency jitter can be absorbed by the use of the feed forward clock generation circuit, but the low frequency jitter can not be absorbed. However, according to this embodiment, both these high and low frequency jitters can be solved.

Fourth Embodiment

Figure 8:
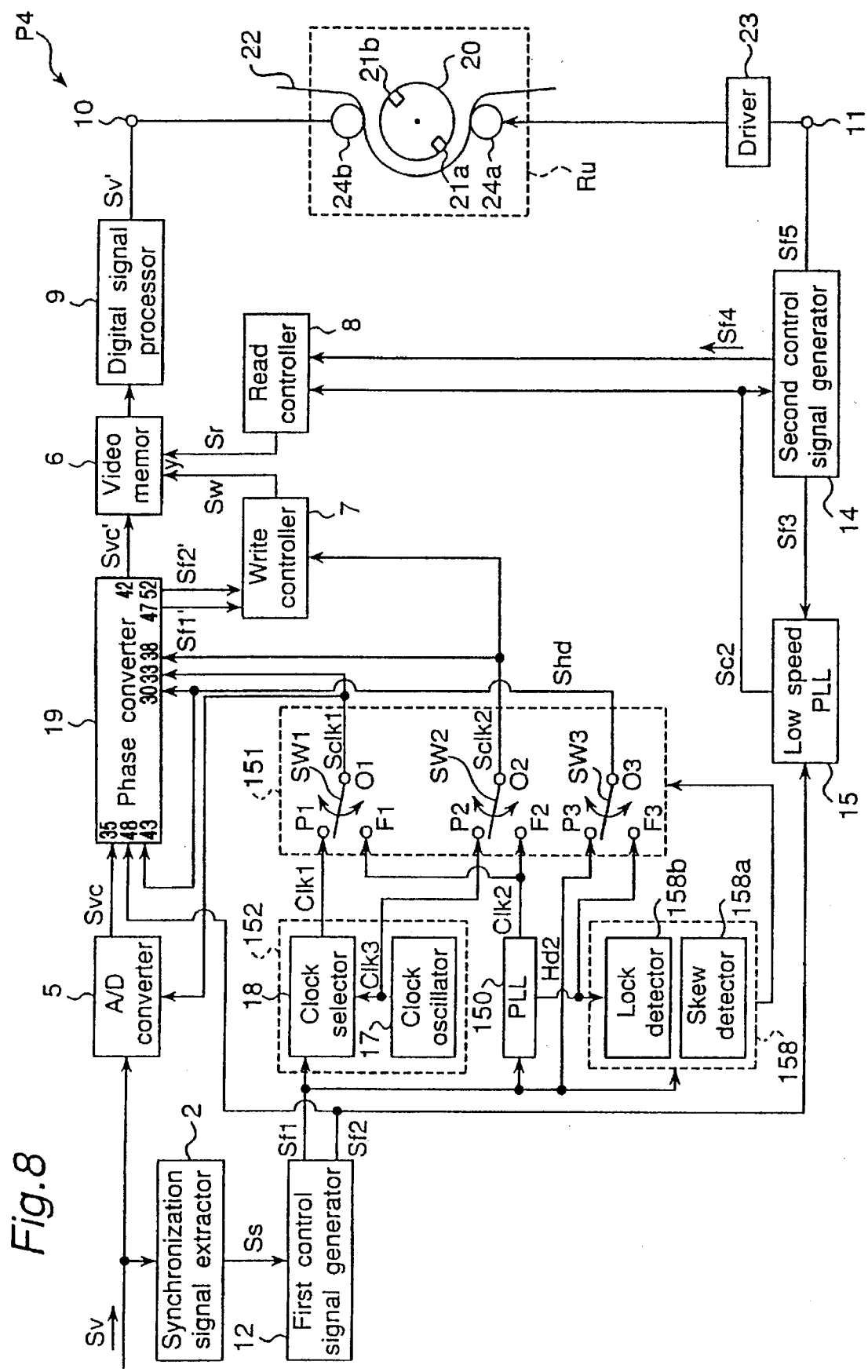
FIG. 8 is a block diagram showing a digital processing apparatus according to a fourth embodiment of the present invention.

Referring to FIG. 8, a digital processing apparatus according to the fourth embodiment of the present invention is shown. In this embodiment, the digital processing apparatus P4 includes the input terminal 1, synchronization signal extractor 2, A/D converter 5, video memory 6, write controller 7, read controller 8, digital signal processor 9, terminals 10 and 11, first control signal generator 12, second control signal generator 14, low speed PLL 15, phase converter 19, driver 23, and recording unit Ru that are connected to each other to function, as described with reference to FIG. 7.

The digital processing apparatus P4 further includes a PLL 150, a signal selector 151, a high speed response locked loop unit 152, and a synchronization detector 158 that are connected to the first control signal generator 12 for receiving the horizontal reference signal Sf1 therefrom.

The clock signal generator 152 includes the clock oscillator 17 and the clock selector 18. The clock oscillator 17 generates a clock signal Clk3 having a predetermined frequency. The clock selector 18 is connected to the oscillator 17 and the first control signal generator 12 for receiving the clock signal Clk3 and the horizontal reference signal Sf1 therefrom, respectively. The clock selector 18 delays the phase of the clock signal Clk3 with reference to the horizontal reference signal Sf1, and produces a clock signal Clk1. In this sense, the clock signal generator 152 constructs a high speed response PLL.

The PLL 150 generates a clock signal Clk2 whose frequency and phase are locked on the horizontal reference signal Sf1. For this purpose, the PLL 150 incorporates a voltage control oscillator, a low pass filter, a phase comparator, and a frequency divider therein. The incorporated phase comparator compares the phase of horizontal reference signal Sf1 with a signal Vcodiv (FIG. 10) having a frequency of approximately 15.7 KHz, for example, that is a submultiple of the 13.5 Mhz frequency of the clock signal Clk2. Then, the PLL 150 generates a horizontal reference signal Hd2 synchronized with the horizontal reference signal Sf1. Thus generated signals Clk2 and Hd2 are transferred to the signal selector 151 separately.

The synchronization detector 158 includes a skew detector 158a and a lock detector 158b. The skew detector 158a detects the presence of skew in a single field of the input video signal Sv based on the horizontal reference signal Sf1. The lock detector 158b is further connected to the PLL 150 for receiving the horizontal signal Hd2 therefrom. Based on the horizontal reference signals Sf1 and Hd2, the lock detector 158b detects whether the PLL 150 is locked on the input video signal Sv. Based on the detection results by these detectors 158a and 158b, the synchronization detector 158 produces a synchronization error signal having two levels. This synchronization error signal shows HIGH when unlock or skew is detected by the detectors 158a or 158b. The synchronization detector 158 is connected to the signal selector 151 for supplying the synchronization error detection signal thereto.

The signal selector 151 includes a first select switch Sw1 having a first output port O1 connected to the A/D converter 5 and the phase converter 19. The first select switch Sw1 has first and second input ports P1 and F1 connected to the clock selector 18 and the PLL 150 for receiving the signals Clk1 and Clk2 therefrom, respectively. Based on the synchronization error detection signal from the synchronization detector 158, the select switch Sw1 selectively connects the output port O1 to either one of input ports P1 and F1 which are currently receiving the signals Clk1 and Clk2, respectively. Thus a clock signal Sclk1 combining the signals Clk1 and Clk2 is transferred to the A/D converter 5 and the phase converter 19 through the output port O1. The signal selector 151 includes a second select switch Sw2 and a third select switch Sw3 similar to the first select switch Sw1.

The second switch Sw2 has a second output port O2 connected to the phase converter 19 and the write controller 7. The switch Sw2 further has third and fourth input ports P2 and F2 connected to the clock oscillator 17 and the PLL 150, respectively. Similarly, the second select switch Sw2 selectively outputs either of the clock signals Clk3 or Clk2, based on the synchronization error detection signal from the synchronization detector 158, as a clock signal Sclk2 to the write controller 7 and the phase converter 19.

The third switch Sw3 has a third output port O3 connected to the phase converter 19. The switch Sw3 further has fifth and sixth input ports P3 and F3 connected to the first control signal generator 12 and the PLL 150, respectively. Similarly, the third select switch Sw3 selectively outputs either of the horizontal signals Sf1 or Hd2, based on the synchronization error detection signal from the synchronization detector 158, as a horizontal reference signal Shd to the phase converter 19.

The A/D converter 5 converts the inputted video signal Sv into the digitized video signal Svc with respect to the clock signal Sclk1 from the switch Sw1. The phase converter 19 converts the signals Svc, Shd, and Sf2 to the signals Svc', Sf1', and Sf2', respectively, that are synchronized with the clock signal Sclk2. Note that the A/D converter 5, phase converter 19, and the write controller 7 operate in substantially the same manner as previously described with reference to the digital processing apparatus P3 shown in FIG. 7.

Figure 9:
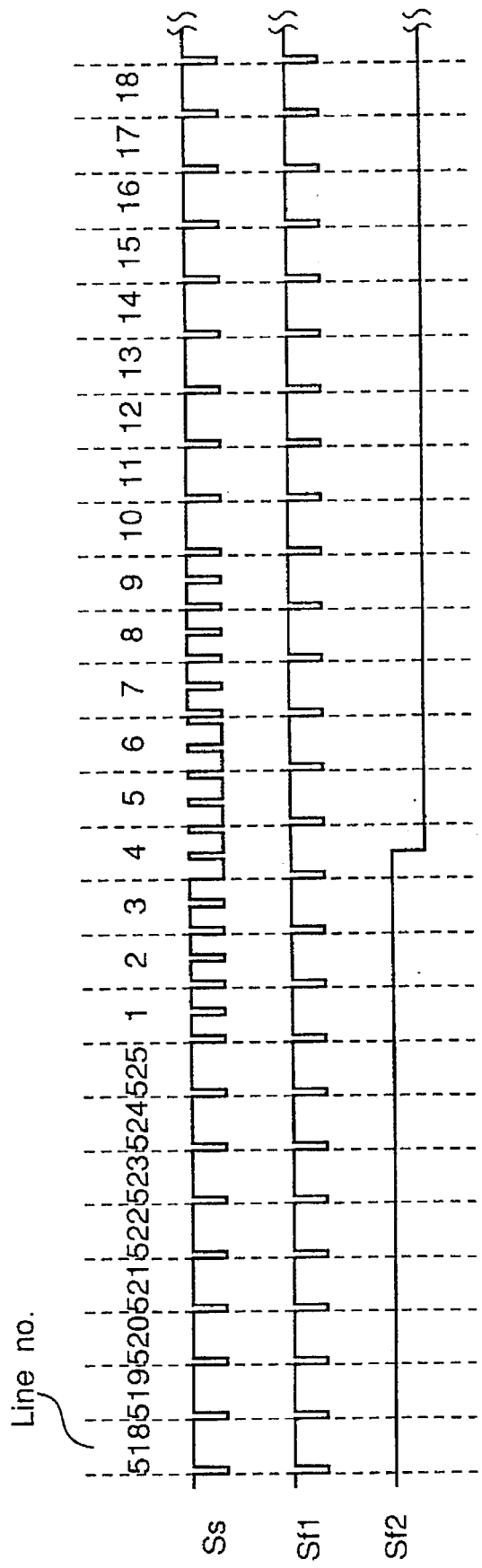
FIG. 9 is a graph showing the composite synchronization signal Ss, the horizontal reference signal Sf1, and the vertical reference signal Sf2 appeared in the digital processing apparatus of FIG. 8.
Figure 10:
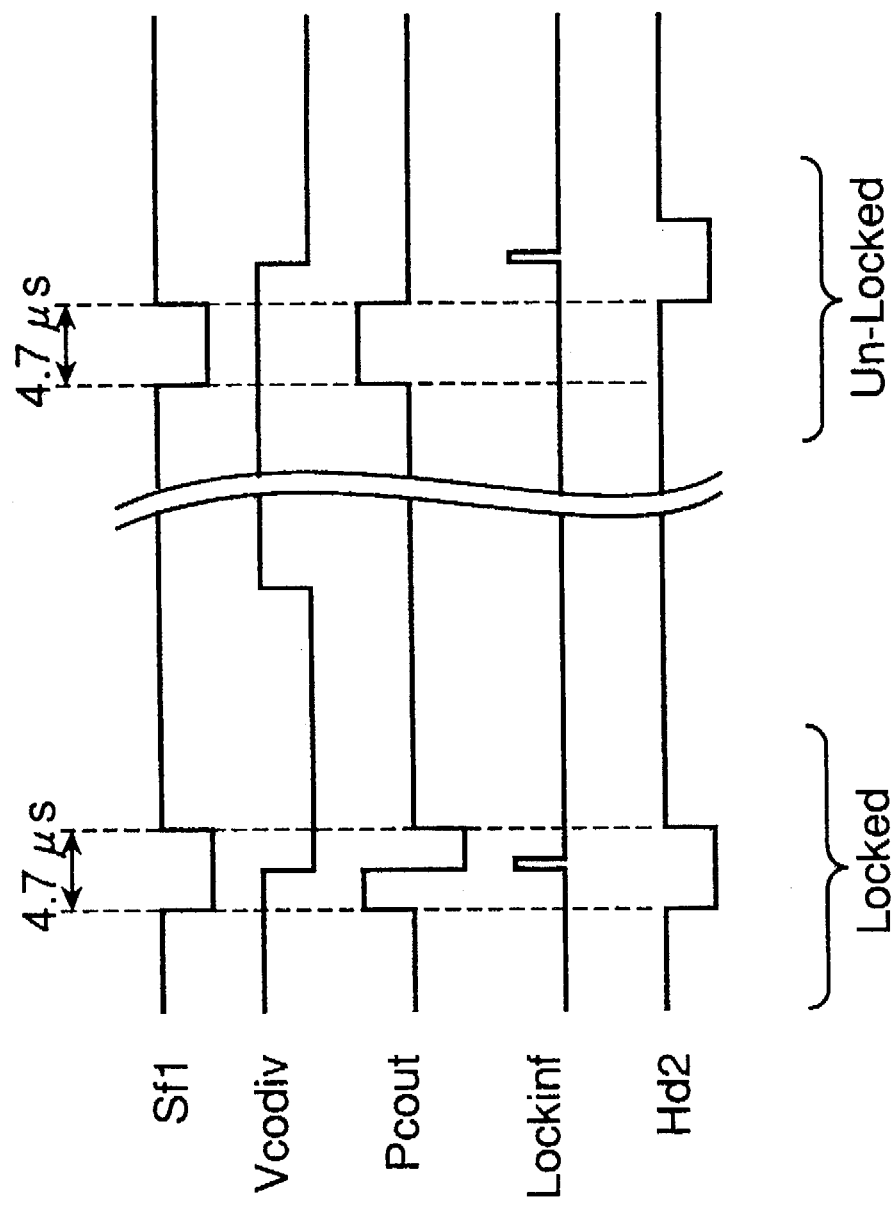
FIG. 10 is a graph showing the signals appeared in the lock detector 158b of FIG. 8.
Figure 11:
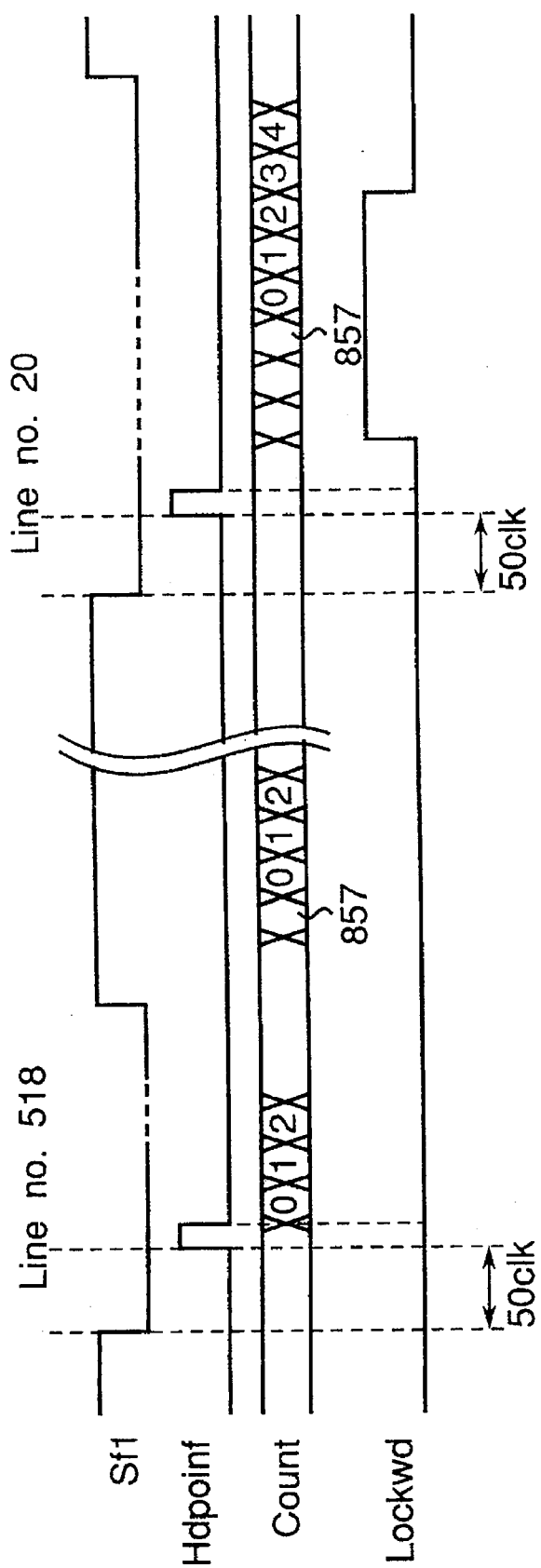
FIG. 11 is a graph showing the signals appeared in the skew detector 158a of FIG. 8.
Figure 12:
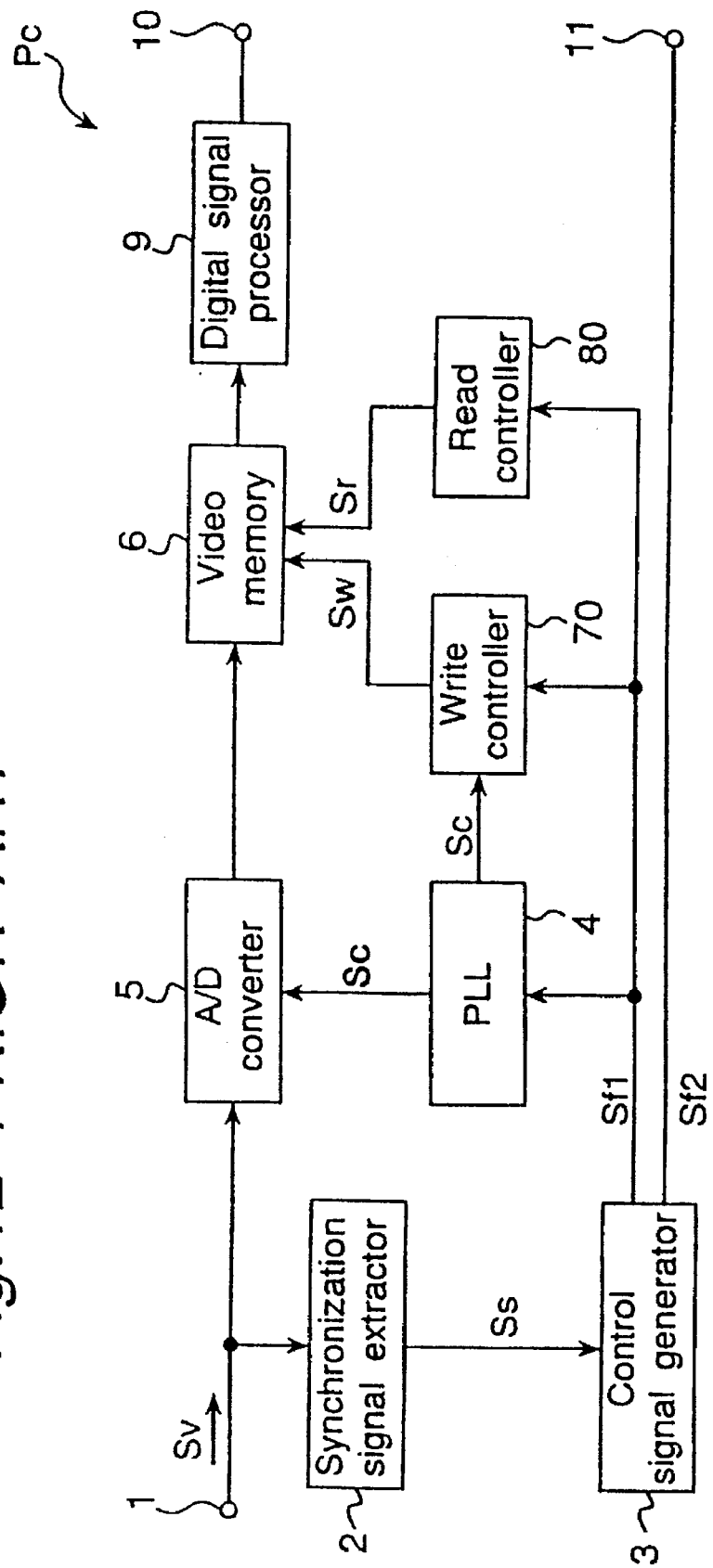
FIG. 12 is a block diagram showing a conventional digital processing apparatus incorporated in a video signal processing apparatus.

With reference to FIGS. 9, 10, and 11, the operation of the synchronization detector 158 is briefly described below. In FIG. 9, the waveforms of composite synchronization signal Ss, the horizontal reference signal Sf1, and the vertical reference signal Sf2 are shown. In FIG. 10, the waveforms of the signals appearing in the lock detector 158b are shown. In FIG. 11, the waveforms of the signals appearing in the skew detector 158a are shown.

In operation, the composite synchronization signal Ss is transferred to the first control signal generator 12, and the horizontal and vertical reference signals Sf1 and Sf2 are generated thereby. These three signals Ss, Sf1, and Sf2 have the waveforms, as best shown in FIG. 9. The horizontal reference signal Sf1 having a predetermined frequency, for example 15.7 KHz, is supplied to the PLL 150, the clock signal generator 152, and the synchronization detector 158.

As best shown in FIG. 10, the PLL 150 feeds the signal Sf1 to the incorporated phase comparator so as to compare the phase of horizontal reference signal Sf1 having the frequency of approximately 15.7 KHz for example, with the clock signal Vcodiv having 1/858 of the frequency (approximately 13.5 MHz) of the clock signal of the clock signal Clk2. The phase comparator outputs a result signal Pcout. The low pass filter derives the frequency components beyond the responding band from the result signal Pcout, and sends thus derived result signal. Pcout to the voltage control oscillator.

Thus, the PLL 150 generates the clock signal Clk2 that will be supplied to the input ports F1 and F2 of the select switches Sw1 and Sw2, respectively, of the signal selector 151. The PLL 150 further divides the frequency of the clock signal Clk2, and generates the horizontal reference signal Hd2 that will be supplied to the lock detector 158b of the synchronization detector 158, and to the input port F3 of the select switch Sw3 of the signal selector 151.

In the clock signal generator 152 constructing the high speed response PLL, the clock oscillator stably generates the clock signal Clk3 having the frequency of 13.5 MHz. The clock selector 18 shifts the clock signal Clk3 in synchronization of the leading edge of the horizontal reference signal Sf1, and generates the clock signal Clk1. The clock signal Clk1 is supplied to the input port P1 of the switch Sw1 of the signal selector 151.

Below, the operation of the synchronization detector 158 is described. The skew detector 158a detects if the skewed period in the field of the horizontal reference signal Sf1 is within a predetermined period. When the deviation of the detected skewed period for one line (approximately for the period of 858 clocks of the clock signal having the frequency of 13.5 MHz under the NTSC system) is over ±3 clocks, the skew detector 158a determines that the signal is skewed.

In FIG. 11, when the horizontal reference signal Sf1 input to the skew detector 158a shows the "LOW" level for the successive fifty clock periods in line no. 518, a signal Hdpoinf turns "HIGH" level. At this time, the skew detector 158a makes an internal counter therein count up. The internal counter increments the counted value Count within the range from 0 to 857. When the horizontal reference signal is in line no. 20 and the counted value Count is within the range from 855 to 2, a signal Lockwd is turned to "HIGH" level.

The skew detector 158a determines that the horizontal reference signal Sf1 is not skewed in the case that the signal Hdpoint shows "HIGH" while the signal Lockwd is showing "HIGH". The skew detector 158a determines that the horizontal reference signal Sf1 is skewed in the case that the signal Hdpoint shows "HIGH" while the signal Lockwd is showing "LOW".

In the left half portion of FIG. 10, the signals when the PLL 150 is locked on the horizontal reference signal Sf1 are shown. The signal Vcodiv is a clock signal produced by the voltage control oscillator to have a submultiple frequency of the clock signal Clk2. The signal Vcodiv has a trailing edge falling within a period when the horizontal reference signal Sf1 shows "LOW" level, as shown in FIG. 10.

The internal phase comparator produces the result signal Pcout that shows "HIGH" when the signal Vcodiv shows "HIGH" during the "LOW" level period of the signal Sf1. The result signal Pcout that shows "LOW" when the signal Vcodiv shows "LOW" during the "LOW" level period of the signal Sf1. The result signal Pcout that shows an intermediate level between "HIGH" and "LOW" when during the "HIGH" level period of the signal Sf1.

In the right half portion of FIG. 10, the signals when the horizontal reference signal Sf1 having the frequency beyond the pull-in range of the PLL 150 are shown. In this case, the trailing edge of the signal Vcodiv is almost falling beyond "LOW" level period of the horizontal reference signal Sf1, as shown in FIG. 10. In consideration of the above described conditions, the lock detector 158b determines whether the PLL 150 is locked to the input signal Sf1, or not, based on the presence of the trailing edge of signal Vcodiv with respect to the level of the horizontal reference signal Sf1. Note that at the trailing edge of the signal Vcodiv, the signal Lockinf shows "HIGH".

In the case where the signal Lockinf shows "HIGH" at a predetermined rate, for example more than 80%, for a unit period of the horizontal reference signal Sf1, the lock detector 158b detects that the PLL 150 is locked. Otherwise, the lock detector 158b detects that the PLL 150 is un-locked.

When the detectors 158a and 158b detect both the skewed and un-locked conditions at the same time, the synchronization detector 158 transfers the synchronization error detection signal showing a "HIGH" level to the signal selector 151. On receipt of this "HIGH" signal, three select switches Sw1, Sw2, and Sw3 select the input ports P1, P2, and P3, respectively.

When the detectors 158a and 158b detect non skew and lock, the synchronization detector 158 transfers the synchronization error detection signal showing a "LOW" level to the signal selector 151. On receipt of this "LOW" signal, three select switches Sw1, Sw2, and Sw3 select the input ports F1, F2, and F3, respectively.

The A/D converter 5 digitizes the video signal Sv with respect to the clock signal Sclk1 from the switch Sw1. The phase converter 19 is supplied with the signals Shd, Sclk1, Svc, Sclk2, Shd, and Sf2 to the input terminals 30, 33, 35, 38, 43, and 47, respectively. The operation by other members of the digital processing apparatus P4 is substantially the same as that according to the third embodiment of the present invention.

As apparent from the above descriptions, by providing the synchronization detector 152 and the signal selector 151, the following effects, in addition to the effects of the apparatus P3, can be obtained in this embodiment. For example, when the horizontal reference signal Sf1 is extracted from the video signal Sv output by a tuner working under a weak electromagnetic field, this signal Sf1 is very sensitive to the noise components contained in the video signal Sv. Due to these noise components, the clock selector shifts the phase of the clock signals to the incorrect position. As a result, the horizontal reference signal also deviates from the correct position, causing the greater degradation in the image reproduced from the video signal Sv.

When the clock selector is used on the reproducing side of a video tape recorder, the user can recognize the influence of the noise on the clock selector according the quality of reproduced image. In such a case where the reproduced image is so degraded, the user can cancel the function of the clock selector for better image reproduction. However, when the clock selector is used on the recording side of the video tape recorder, the user can not cancel the function of the clock selector even by employing the digital processing apparatus P3 according to the third embodiment of the present invention.

To solve these problems, the digital processing apparatus P4 according to this embodiment, when the video signal (Sf1) is free from the skew and frequency variation, the horizontal reference signal and clock signal generated by a PLL having a crystal incorporated voltage control oscillator, to have an extremely stable frequency, are used for the following digital processing of the video signal. As a result, the image having a very improved quality can be reproduced even under the weak electromagnetic field.

Furthermore, when the video signal having greater skews is input to the digital processing apparatus, the response time of the PLL becomes greater than the vertical blanking period of the television signal. In this case, the PLL can not follow the skews in the video signal.

For processing such skewed video signal signals, the clock signal generated by the clock selector is more suitable and enabling to prevent the reproduced image from distorting in the horizontal direction.

According to the fourth embodiment, the video signal under the weak electromagnetic field or the non-standard video signal having jitters can be recorded and reproduced using very stable conditions.

It is to be noted that by providing the synchronization detector 158 constructed by both the skew detector 158a and the lock detector 158b, it is possible to design the PLL 150 taking into consideration the jitter suppression, resulting in the enhancement of the anti-weak electromagnetic field characteristics. In other words, the response time to the skewed video signal can be negligible. In this sense, only the lock detector 158b without the skew detector 158a is effective.

Furthermore, the voltage control oscillator incorporated in the PLL 150 can be constructed by various components such as a crystal and LC resonant circuits. The clock selector 18 can select the clock signal with respect to the leading edge instead of the trailing edge. The skew detector 158b can detect the presence of skew in the horizontal reference signal Hd2 instead of the first horizontal reference signal Sf1. The lock detector 158a can be constructed to detect the locked condition of the signal in a manner other than described in the above. The clock signal Clk2, instead of the output signal from the clock oscillator 17, can be supplied to the clock selector 18, as performed in the third embodiment.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A digital processing apparatus for processing an analog source signal including a first synchronization signal having a first predetermined frequency and a second synchronization signal having a second predetermined frequency smaller than said first predetermined frequency comprising:

a first reference signal generation means for generating a first reference signal based on said first synchronization signal;

a second reference signal generation means for generating a second reference signal based on said second synchronization signal;

a first clock signal generation means for generating a first clock signal whose phase is locked on said first reference signal;

an analog to digital converter means for sampling said analog source signal with respect to said first clock signal to generate a digitized source signal;

a memory means for storing at least one field of said digitized source signal;

a write control means for controlling said memory means, to store said digitized source signal, based on said first reference signal and said first clock signal;

a third reference signal generation means for generating a third reference signal and a fourth reference signal based on a second clock signal, said third reference signal and said fourth reference signal each having a respective predetermined frequency, that is a submultiple of said second clock signal;

a second clock signal generation means for generating said second clock signal synchronized with said second reference signal and said third reference signal; and a read control means for controlling said memory means, for reading said stored digitized source signal from said memory means, based on said fourth reference signal and said second clock signal.

2. A digital processing apparatus as claimed in claim 1, further comprising a recording means for recording said digitized source signal onto a recording medium.

3. A digital processing apparatus as claimed in claim 1, wherein said memory means can rearrange the order of said stored digitized source data.

4. A digital processing apparatus as claimed in claim 1, wherein said memory means can convert a respective frequency of luminance signal dam and color difference signal data by changing a frequency of signals on which said memory means stores and reads out said digitized source data.

5. A digital processing apparatus as claimed in claim 2, wherein said third reference signal generation means produces a servo signal for controlling said recording means with respect to said recording medium.

6. A digital processing apparatus for processing an analog source signal including a first synchronization signal having a first predetermined frequency and a second synchronization signal having a second predetermined frequency smaller than said first predetermined frequency comprising:

a first reference signal generation means for generating a first reference signal based on said first synchronization signal;

a second reference signal generation means for generating a second reference signal based on said second synchronization signal;

a first clock signal generation means for generating a first clock signal whose frequency is constant, said first clock signal having a phase;

a second clock signal generation means for shifting the phase of said first clock signal in response to said first reference signal to generate a second clock signal, said second clock signal having a phase which is locked on said first synchronization signal;

an analog to digital convertor means for sampling said analog source signal with respect to said second clock signal to generate a first digitized source signal;

a phase converter means for converting the phase of said second clock signal into the phase of said first clock signal and maintaining a relative timing between said first reference signal and said first digitized source signal for generating:

(a) a third reference signal,
(b) a fourth reference signal, and
(c) a second digitized source signal, based on:
  (a) said first reference signal,
  (b) said second reference signal, and
  (c) said first digitized source signal, respectively;

a memory means for storing at least one field of said second digitized source signal;

a write control means for controlling said memory means, to store said second digitized source signal, based on:
(a) said first clock signal,
(b) said third reference signal, and
(c) said fourth reference signal;

a third clock signal generation means for generating a third clock signal synchronized with said second reference signal and a fifth reference signal; and a fifth reference signal generation means for generating said fifth reference signal and a sixth reference signal based on said third clock signal, said fifth reference signal and said sixth reference signal each having a respective predetermined frequency that is a submultiple of said third clock signal;

a read control means for controlling said memory means, for reading said stored second digitized source signal from said memory means, based on said sixth reference signal and said third clock signal.

7. A digital processing apparatus for processing an analog source signal including a first synchronization signal having a first predetermined frequency and a second synchronization signal having a second synchronization signal having a second predetermined frequency smaller than said first predetermined frequency comprising:

a first reference signal generation means for generating a first reference signal and a second reference signal based on said first synchronization signal and second synchronization signal, respectively;

a first clock signal generation means for generating a first clock signal whose phase is locked on said first reference signal;

an analog to digital convertor means for sampling said analog source signal, with respect to said first clock signal, to generate a digitized source signal;

a memory means for storing at least one field of said digitized source signal;

a write control means for controlling said memory means to store said digitized source signal based on said first reference signal and said first clock signal;

a second reference signal generation means for generating a third reference signal and a fourth reference signal based on a second clock signal, said third reference signal and said fourth reference signal each having a respective predetermined frequency, that is a submultiple of said second clock signal;

a second clock signal generation means for generating said second clock signal synchronized with said second and third reference signals; and a read control means for controlling said memory means, for reading said stored digitized source signal from said memory means, based on said fourth reference signal and said second clock signal.

8. A digital processing apparatus for processing an analog source signal including a first synchronization signal having a first predetermined frequency and a second synchronization signal having a second predetermined frequency smaller than said first predetermined frequency comprising:

a clock signal generation means for generating a first clock signal and a second clock signal whose respective phases are locked on said first synchronization signal and on said second synchronization signal, respectively;

an analog to digital convertor means for sampling said analog source signal with respect to said first clock signal to generate a digitized source signal;

a memory means for storing at least one field of said digitized source signal;

a write control means for controlling said memory means, to store said digitized source signal, based on said first synchronization signal and said first clock signal; and a read control means for controlling said memory means, for reading said stored digitized source signal from said memory means, based on said second synchronization signal and said second clock signal.

9. A digital processing apparatus for processing an analog source signal comprising:

a clock signal generation means for generating a first clock signal and a second clock signal whose respective phases are locked on a first synchronization signal and a second synchronization signal, respectively;

an analog to digital convertor means for sampling said analog source signal with respect to said first clock signal to generate a digitized source signal; and a memory means for:
(a) storing at least one field of said digitized source signal based on said first synchronization signal and said first clock signal and
(b) reading said stored digitized source signal from said memory means based on said second synchronization signal and said second clock signal.

10. A digital processing apparatus as claimed in claim 6, wherein the phase of said first clock signal and the frequency of said first clock signal are locked on said first reference signal.

11. A digital processing apparatus as claimed in claim 10, wherein said first clock signal generation means is comprised of a phase looked loop unit.

12. A digital processing apparatus for processing an analog source signal including a first synchronization signal having a first predetermined frequency and a second synchronization signal having a second predetermined frequency smaller than said first predetermined frequency comprising:

first reference signal generation means for generating a first reference signal based on said first synchronization signal;

second reference signal generation means for generating a second reference signal based on said second synchronization signal;

first clock signal generation means for generating a first clock signal, said first clock signal having a constant frequency;

second clock signal generation means for generating a second clock signal, said second clock signal having a phase locked on said first synchronization signal by shifting a phase of said first clock signal responsive to said first reference signal;

third clock signal generation means for generating a third clock signal and a third synchronization signal each having a respective phase locked on said first synchronization signal;

synchronization judging means for determining if the respective phases of said first reference signal and said third synchronization signal are within a predetermined range;

switch means for selectively outputting:
 (a) one of said first reference signal and said third synchronization signal as a third reference signal,
 (b) one of said second clock signal and said third clock signal as a fourth clock signal, and
 (c) one of said first clock signal and said third clock signal as a fifth clock signal said fifth clock signal having a phase.

analog to digital convertor means for generating a first digitized source signal by sampling said analog source signal based on said fourth clock signal;

phase converter means for convening the respective phases of:
 (a) said second reference signal,
 (b) said third reference signal, and
 (c) said first digitized source signal
 into the phase of said fifth clock signal keeping a relative timing between said third reference signal and said first digitized source signal to generate a fourth reference signal, a fifth reference signal, and a second digitized source signal respectively;

memory means for storing at least one field of said second digitized source signal;

write control means for controlling said memory means, for storing said second digitized source signal, based on:
 (a) said fourth reference signal,
 (b) said fifth reference signal, and
 (c) said fifth clock signal;

fourth clock signal generation means for generating a sixth clock signal synchronized with said second reference signal and a seventh reference signal;

third reference signal generation means for generating said seventh reference signal and an eighth reference signal based on:
 (a) said sixth clock signal,
 (b) said seventh reference signal, and
 (c) said eighth reference signal,
 each having a predetermined frequency that is a submultiple of said sixth clock signal; and read control means for controlling said memory means, for reading said stored second digitized source signal from said memory means, based on said eighth reference signal and said sixth clock signal.

13. A digital processing apparatus as claimed in claim 12, wherein said third clock signal generation means is comprised of a phased looked loop unit.

* * * * *

UNITED STATES PATENT AND TRADE MARK OFFICE
CERTIFICATE OF CORRECTION

PATENT NO. : 5,671,260
DATED : September 23, 1997
INVENTOR(S) : Yamauchi et al.

It is certified that error appears in the above-identified patent and that said Letters Patent is hereby corrected as shown below:

Column 20, line 52, delete "dam" and insert --data--.

Column 22, line 58, delete "looked" and insert --locked--.

Column 23, line 28, delete the period "." and insert --;--.

Column 23, line 32, delete "convening" and insert --converting--.

Column 24, line 33, delete "looked" and insert --locked--.

Signed and Sealed this

Seventh Day of April, 1998

*Attest:*

BRUCE LEHMAN

*Attesting Officer*  Commissioner of Patents and Trademarks